US009240858B2

(12) United States Patent
Endo et al.

(10) Patent No.: US 9,240,858 B2
(45) Date of Patent: Jan. 19, 2016

(54) OPTICAL COMMUNICATION SYSTEM, OPTICAL COMMUNICATION METHOD, OPTICAL COMMUNICATION DEVICE, AND METHOD AND PROGRAM FOR CONTROLLING THE SAME

(75) Inventors: Kazuomi Endo, Tokyo (JP); Yoichi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 13/988,444

(22) PCT Filed: Nov. 22, 2011

(86) PCT No.: PCT/JP2011/077450
§ 371 (c)(1),
(2), (4) Date: May 20, 2013

(87) PCT Pub. No.: WO2012/070686
PCT Pub. Date: May 31, 2012

(65) Prior Publication Data
US 2013/0243434 A1    Sep. 19, 2013

(30) Foreign Application Priority Data
Nov. 22, 2010    (JP) .................................. 2010-260156

(51) Int. Cl.
*H04B 10/00* (2013.01)
*H04J 14/06* (2006.01)
(Continued)

(52) U.S. Cl.
CPC ............ *H04J 14/06* (2013.01); *H04B 10/5561* (2013.01); *H04B 10/6166* (2013.01)

(58) Field of Classification Search
CPC ................ H04B 10/60–10/64; H04B 10/6166; H04B 10/5561; H04J 14/06
See application file for complete search history.

(56) References Cited

U.S. PATENT DOCUMENTS

| 8,744,275 B2 * | 6/2014 | Liu ..................... H04B 10/2507 398/183 |
| 2004/0096143 A1 * | 5/2004 | Shpantzer .......... G02B 6/12004 385/16 |

(Continued)

FOREIGN PATENT DOCUMENTS

| JP | 2010-251851 A | 11/2010 |
| WO | 2005-008923 A2 | 1/2005 |

OTHER PUBLICATIONS

Seb J. Savory, et al., "Electronic compensation of chromatic dispersion using a digital coherent receiver", Optics Express, 2007, 7 pages, vol. 15, No. 5.

(Continued)

*Primary Examiner* — Danny Leung
(74) *Attorney, Agent, or Firm* — Sughrue Mion, PLLC

(57) ABSTRACT

In order to perform the polarization demultiplexing of the polarization multiplexed BPSK signal using a small-scale circuit by means of optical phase modulation of the polarization multiplexed BPSK signal into the pseudo polarization multiplexed QPSK signal, an optical communication system for communicating by using polarization multiplexed optical signals includes an optical phase modulation means for modulating phases of a plurality of optical signals employing BPSK modulation system including information to be communicated, and for generating a plurality of optical signals to become signals by pseudo QPSK modulation system; and a signal restoration means for performing polarization demultiplexing of a plurality of polarization multiplexed optical signals from a plurality of optical signals modulated into the pseudo QPSK modulation system, and for restoring the information to be communicated.

10 Claims, 14 Drawing Sheets

(51) Int. Cl.
*H04B 10/556* (2013.01)
*H04B 10/61* (2013.01)

(56) References Cited

U.S. PATENT DOCUMENTS

2004/0208646 A1* 10/2004 Choudhary et al. .......... 398/188
2006/0147219 A1   7/2006 Yoshino et al.
2010/0260504 A1* 10/2010 Takahara ..................... 398/152
2011/0274436 A1* 11/2011 McNicol et al. .............. 398/140
2012/0177372 A1*  7/2012 Liu ..................... H04B 10/5053
                                                           398/65
2012/0320442 A1* 12/2012 Gabory ............... H04L 27/2096
                                                          359/238

OTHER PUBLICATIONS

International Search Report of PCT/JP2011/077450, dated Mar. 6, 2012.

* cited by examiner

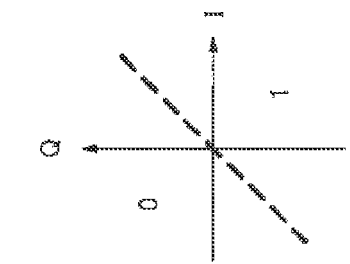
FIG. 11A  FIG. 11B  FIG. 11C  FIG. 11D
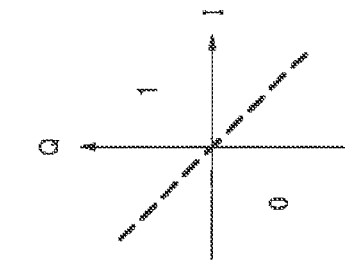
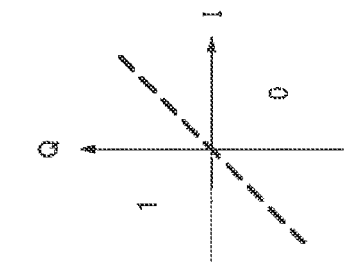
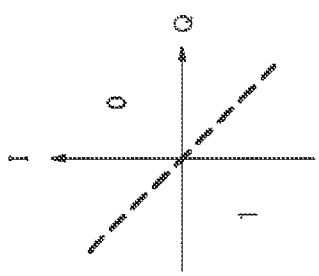
FIG. 11E  FIG. 11F  FIG. 11G  FIG. 11H

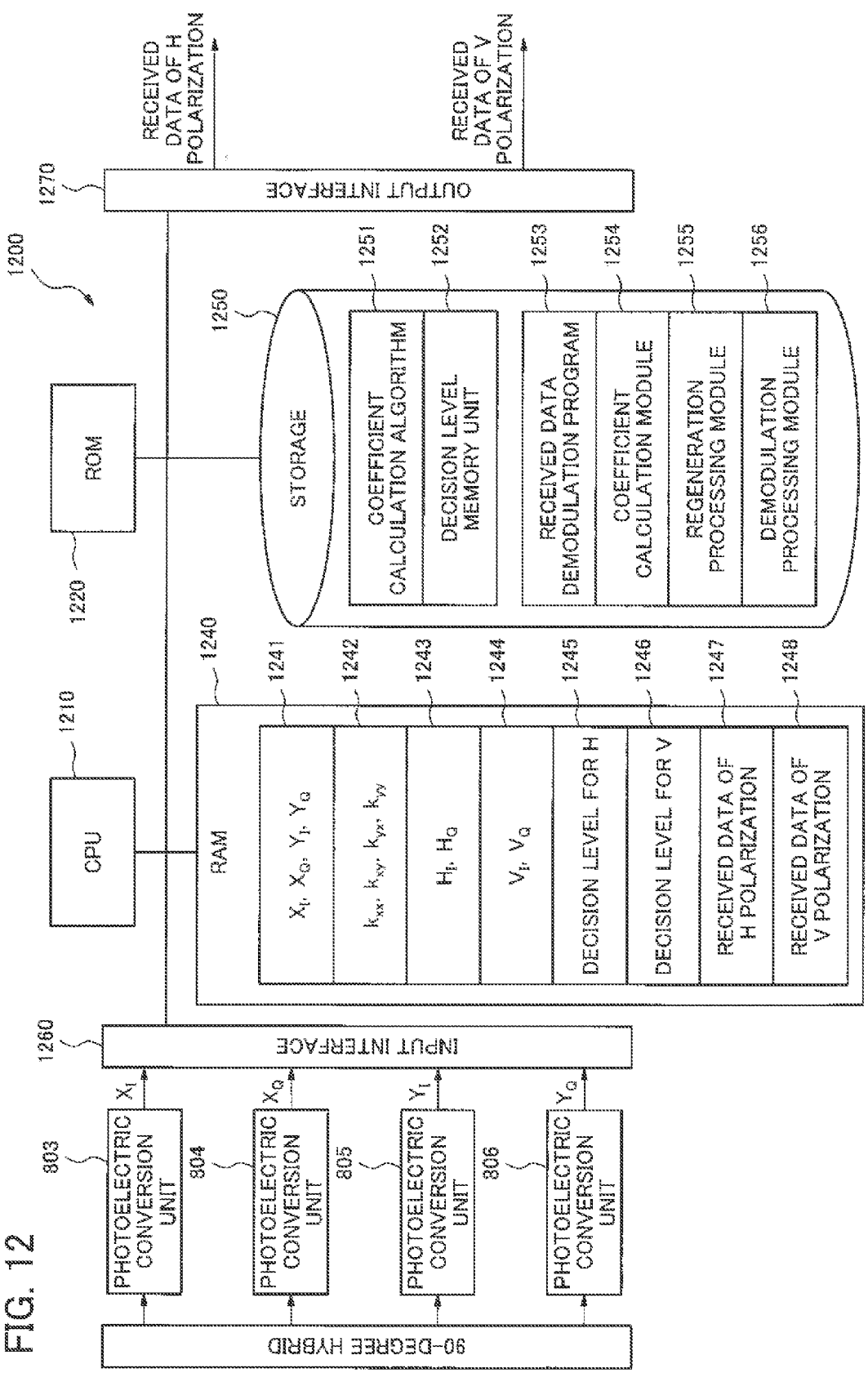

OPTICAL COMMUNICATION SYSTEM, OPTICAL COMMUNICATION METHOD, OPTICAL COMMUNICATION DEVICE, AND METHOD AND PROGRAM FOR CONTROLLING THE SAME

CROSS REFERENCE TO RELATED APPLICATIONS

This application is a National Stage of International Application No. PCT/JP2011/077450 filed Nov. 22, 2011, claiming priority based on Japanese Patent Application No. 2010-260156 filed Nov. 22, 2010, the contents of all of which are incorporated herein by reference in their entirety.

TECHNICAL FIELD

The present invention relates to communication technologies in an optical communication system which communicates using polarization multiplexed optical signals.

BACKGROUND ART

In order to increase transmission capacity in an optical communication system, a polarization multiplexing system employing QPSK (Quadrature Phase Shift Keying) modulation system is disclosed in non patent literature 1, for example. In non patent literature 1, a polarization beam splitter separates a polarization multiplexed optical signal into two optical signals whose polarization are orthogonal each other. Next, a 90-degree hybrid mixes each separated optical signal with local oscillation light and outputs optical signals corresponding to an in-phase component and a quadrature component, respectively. And then, a photodiode converts each of the output optical signals of the 90-degree hybrid into an electric signal.

In non patent literature 1, since polarization demultiplexing is realized by digital signal processing based on this electric signal, an adjustment is not performed to match a polarization plane of the polarization multiplexed optical signal with a polarization plane of the polarization separated by the polarization beam splitter which is a reference axis of the polarization beam splitter. That is to say, the electric signal output by each photodiode includes signal components transmitted by each polarization wave respectively. However, filter coefficients are obtained which represent the relation to each signal component, and each signal component is restored from each electric signal by digital processing. The fact is utilized for calculating the filter coefficient in non patent literature 1 that the amplitude of the QPSK signal of the modulation system employed is constant. In this way, the polarization demultiplexing in the polarization multiplexed QPSK optical signal by the digital signal processing disclosed in non patent literature 1 does not need the adjustment of optical polarization plane, and a highly-reliable system is realized at low cost.

Non Patent Literature 1: Seb J. Savory et al., "Electronic compensation of chromatic dispersion using a digital coherent receiving device", OPTICS EXPRESS 2120, Vol. 15, No. 5, March, 2007.

DISCLOSURE OF INVENTION

Problem to be Solved by the Invention

However, in order to further increase transmission capacity and transmission distance in the optical communication system, it has been studied to apply the polarization multiplexing technology by BPSK (Binary Phase Shift Keying) modulation system, in which Euclidean distance on the constellation is the longest, to the optical communication system. However, if the technology disclosed in non patent literature 1 is applied to the polarization multiplexed BPSK optical signal, there is a problem that unlike in the case of the polarization multiplexed QPSK optical signal, it is impossible to demultiplex the polarization if there is a phase difference between polarized waves. Accordingly, it is conceivable to compensate the phase difference between the polarized waves before polarization demultiplexing in the polarization multiplexed BPSK optical signal, however, it is very difficult to detect the phase difference between the polarized waves. Furthermore, it is not a realistic approach to compensate the phase difference between the polarized waves before polarization demultiplexing because it is thought that the circuit scale increases due to addition of a circuit to detect the phase difference and a circuit to compensate the phase difference.

The object of the present invention is to provide the technology which solves the above-mentioned problem.

Means for Solving a Problem

In order to achieve the above-mentioned object, a system according to an exemplary aspect of the invention is an optical communication system for communicating by using polarization multiplexed optical signals, which includes an optical phase modulation means for modulating phases of a plurality of optical signals employing BPSK modulation system including information to be communicated, and for generating a plurality of optical signals to become signals by pseudo QPSK modulation system; and a signal restoration means for performing polarization demultiplexing of a plurality of polarization multiplexed optical signals from a plurality of optical signals modulated into the pseudo QPSK modulation system, and for restoring the information to be communicated.

In order to achieve the above-mentioned object, a method according to an exemplary aspect of the invention is an optical communication method for communicating by using polarization multiplexed optical signals, which includes the steps of an optical phase modulation step for modulating phases of a plurality of optical signals employing BPSK modulation system including information to be communicated, and for generating a plurality of optical signals to become signals by pseudo QPSK modulation system; and a signal restoration step for performing polarization demultiplexing of a plurality of polarization multiplexed optical signals from a plurality of optical signals modulated into the pseudo QPSK modulation system, and for restoring the information to be communicated.

In order to achieve the above-mentioned object, a device according to an exemplary aspect of the invention is an optical communication device in an optical communication system for communicating by using polarization multiplexed optical signals, which includes an optical phase modulation means for modulating a phase of an optical signal employing BPSK modulation system including information to be communicated, and for generating an optical signal to become a signal by pseudo QPSK modulation system; wherein the optical signal to become a signal by the pseudo QPSK modulation system is output to a polarization synthesizer performing polarization multiplexing.

In order to achieve the above-mentioned object, a method according to an exemplary aspect of the invention is a method for controlling an optical communication device in an optical communication system for communicating by using polarization multiplexed optical signals, which includes an optical phase modulation step for modulating a phase of an optical signal employing BPSK modulation system including information to be communicated, and for generating an optical signal to become a signal by pseudo QPSK modulation system.

In order to achieve the above-mentioned object, a program according to an exemplary aspect of the invention is a program for controlling an optical communication device in an optical communication system for communicating by using polarization multiplexed optical signals, which includes the step of, which is executed by a computer, an optical phase modulation step for modulating a phase of an optical signal employing BPSK modulation system including information to be communicated, and for generating an optical signal to become a signal by pseudo QPSK modulation system.

In order to achieve the above-mentioned object, a device according to an exemplary aspect of the invention is an optical communication device in an optical communication system for communicating by using polarization multiplexed optical signals, which includes an optical phase modulation means for modulating phases of a plurality of optical signals whose polarizations are orthogonal to each other, separated from polarization multiplexed light by a polarization beam splitter, and for generating a plurality of optical signals by pseudo QPSK modulation system; and a signal restoration means for performing polarization demultiplexing of a plurality of polarization multiplexed optical signals from a plurality of optical signals modulated into the pseudo QPSK modulation system, and for restoring information to be communicated.

In order to achieve the above-mentioned object, a method according to an exemplary aspect of the invention is a method for controlling an optical communication device in an optical communication system for communicating by using polarization multiplexed optical signals, which includes the steps of an optical phase modulation step for modulating phases of a plurality of optical signals whose polarizations are orthogonal to each other, separated from polarization multiplexed light by a polarization beam splitter, and for generating a plurality of optical signals by pseudo QPSK modulation system; and a signal restoration step for performing polarization demultiplexing of a plurality of polarization multiplexed optical signals from a plurality of optical signals modulated into the pseudo QPSK modulation system, and for restoring information to be communicated.

In order to achieve the above-mentioned object, a program according to an exemplary aspect of the invention is a program for controlling an optical communication device in an optical communication system for communicating by using polarization multiplexed optical signals, which includes the steps of, which are executed by a computer, an optical phase modulation step for modulating phases of a plurality of optical signals whose polarizations are orthogonal to each other, separated from polarization multiplexed light by a polarization beam splitter, and for generating a plurality of optical signals by pseudo QPSK modulation system; and a signal restoration step for performing polarization demultiplexing of a plurality of polarization multiplexed optical signals from a plurality of optical signals modulated into the pseudo QPSK modulation system, and for restoring information to be communicated.

Effect of the Invention

According to the present invention, it is possible to perform the polarization demultiplexing of the polarization multiplexed BPSK signal using a small-scale circuit by means of optical phase modulation of the polarization multiplexed BPSK signal into the pseudo polarization multiplexed QPSK signal.

BRIEF DESCRIPTION OF THE DRAWINGS

FIGS. 11A to 11H are diagrams showing another examples of the decision levels on the constellations in symbol decision used in the demodulation processing unit in accordance with the second exemplary embodiment of the present invention.

FIG. 12 is a block diagram showing a hardware configuration of a control unit in the optical receiving unit in accordance with the second exemplary embodiment of the present invention.

DESCRIPTION OF EMBODIMENTS

The exemplary embodiments of the present invention will be exemplarily described in detail with reference to drawings below. However, the components described in the following exemplary embodiments are merely examples, and it is not intended that the technical scope of the present invention is limited to those only.

The First Exemplary Embodiment

An optical communication system 100 as the first exemplary embodiment of the present invention will be described using FIG. 1. The optical communication system 100 is a system to communicate using polarization multiplexed optical signals.

Figure 1:
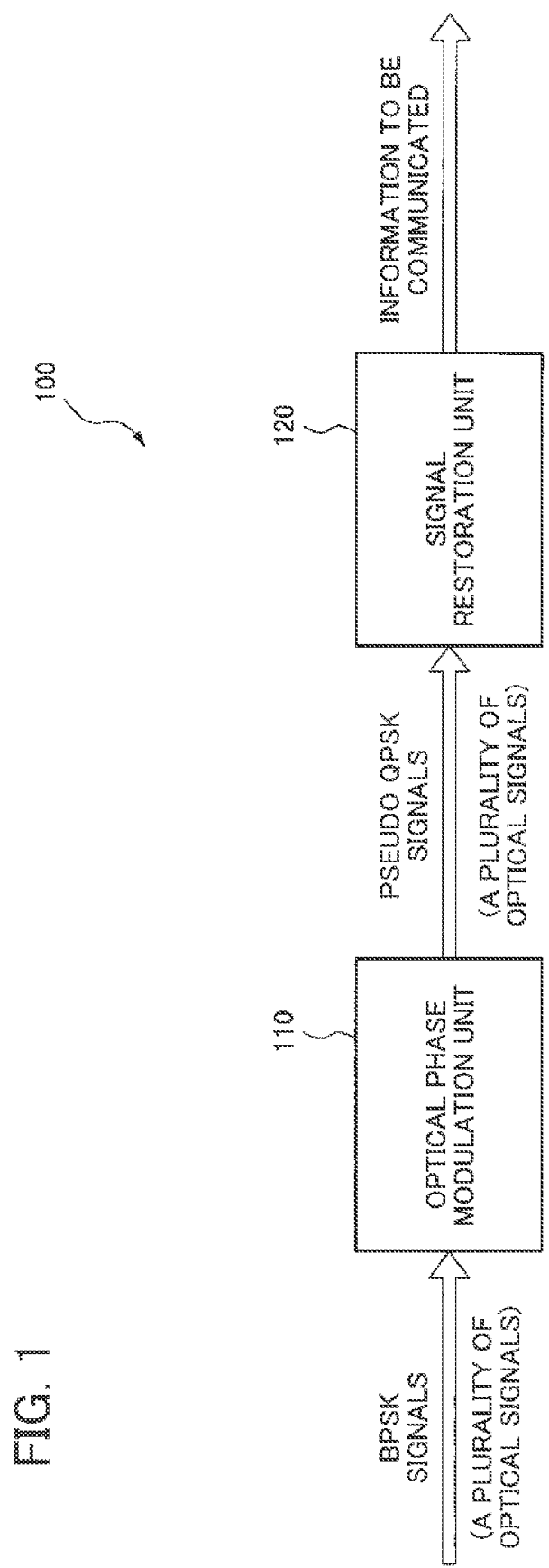
FIG. 1 is a block diagram showing a configuration of an optical communication system in accordance with the first exemplary embodiment of the present invention.

As shown in FIG. 1, the optical communication system 100 includes an optical phase modulation unit 110 and a signal restoration unit 120. The optical phase modulation unit 110 modulates phases of a plurality of optical signals employing BPSK modulation system which includes information to be communicated, and generates a plurality of optical signals to become signals by pseudo QPSK modulation system. The signal restoration unit 120 performs the polarization demultiplexing of a plurality of polarization multiplexed optical signals from a plurality of optical signals modulated into the pseudo QPSK modulation system, and restores the information to be communicated.

According to the present exemplary embodiment, it is possible to perform the polarization demultiplexing of the polarization multiplexed BPSK signal by means of optical phase modulation of the polarization multiplexed BPSK signal into the pseudo polarization multiplexed QPSK signal.

The Second Exemplary Embodiment

An optical communication system of the second exemplary embodiment of the present invention will be described. In the second exemplary embodiment, before performing the polarization multiplexing which generates polarization multiplexed light by a polarization synthesizer, optical signal modulated by a BPSK modulation system (hereinafter, a BPSK signal) is modulated by optical phase modulation into optical signal to be modulated by a pseudo QPSK modulation system (hereinafter, a QPSK signal) in each optical transmission device which generates an optical signal from transmission data. According to the present exemplary embodiment, it is possible to perform the polarization demultiplexing for a BPSK modulated optical signal in a low-cost and highly-reliable digital domain without changing or adding a circuit in a receiving side.

<A Configuration of the Optical Communication System in Accordance with the Second Exemplary Embodiment>

Figure 2:
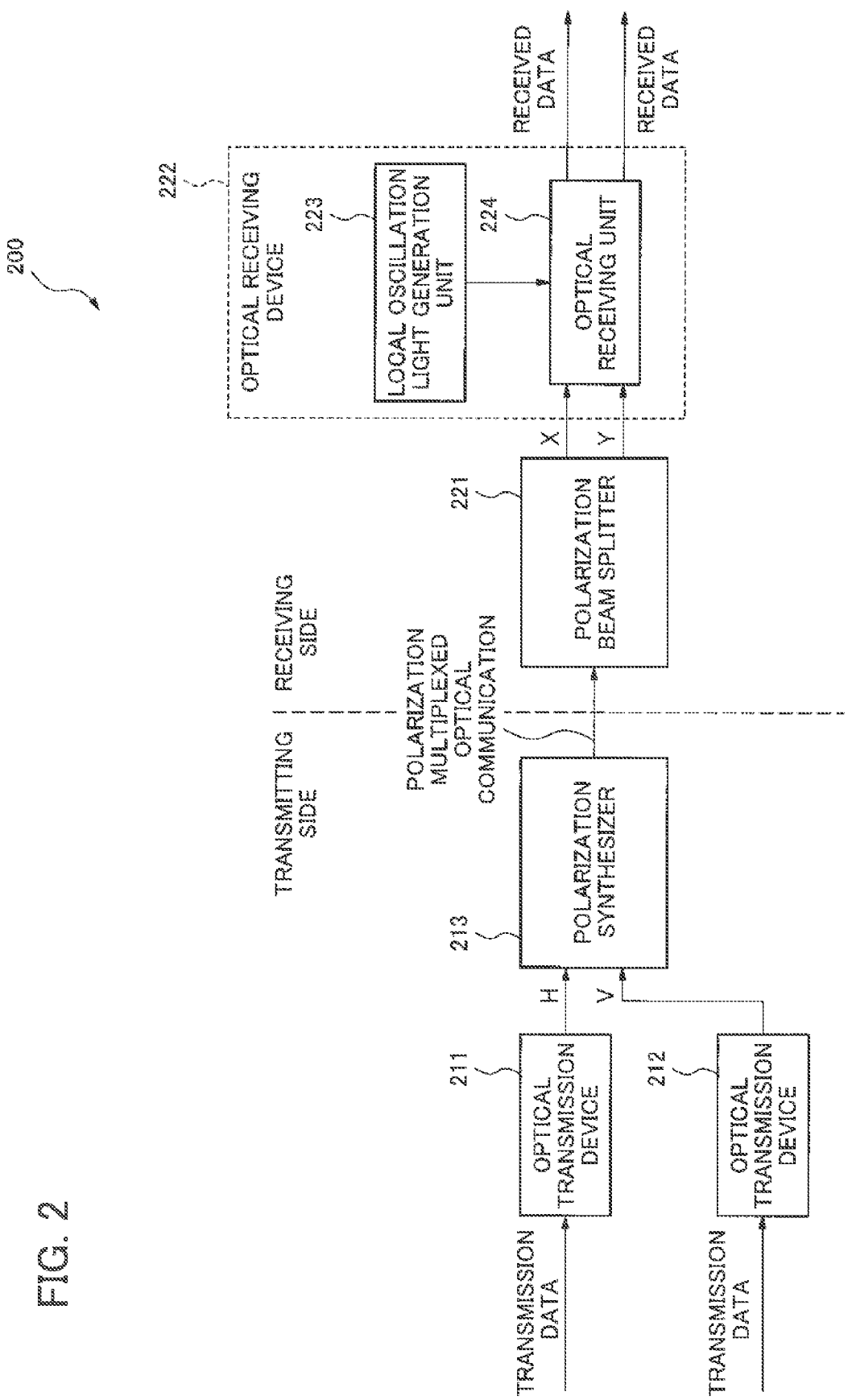
FIG. 2 is a block diagram showing a configuration of an optical communication system in accordance with the second exemplary embodiment of the present invention.

FIG. 2 is a block diagram showing a configuration of the optical communication system 200 in accordance with the second exemplary embodiment of the present invention.

According to FIG. 2, the optical communication system 200 has a transmitting side including a plurality of optical transmission devices 211, 212 and a polarization synthesizer 213, and a receiving side including a polarization beam splitter 221 and an optical receiving device 222. The optical receiving device 222 includes a local oscillation light generation unit 223 and an optical receiving unit 224. Although the optical transmission device and the optical receiving device are illustrated separately in FIG. 2, they are provided as an optical transmission and receiving device including the optical transmission device and the optical receiving device.

In the transmitting side, a plurality of optical transmission devices 211, 212 are the same except that the polarization of output optical signals is different from each other by 90 degrees. The polarization synthesizer 213 performs polarization multiplexing of an optical signal H (horizontal polarization optical signal) from the optical transmission device 211 and an optical signal V (vertical polarization optical signal) from the optical transmission device 212, and outputs them to an optical transmission path. Here, the polarization relationship between the optical signal H and the optical signal V is orthogonal. That is to say, the optical transmission devices 211 and 212 generate pseudo QPSK signals so that the polarization of the optical signal H and that of the optical signal V may be orthogonal to each other, and the polarization synthesizer 213 performs polarization multiplexing on those optical signals and transmits them to the optical transmission path.

In the receiving side, the polarization beam splitter 221 performs optical separation of the polarization multiplexed optical signal received from the optical transmission path into an optical signal X and an optical signal Y whose polarizations are orthogonal to each other. In the present exemplary embodiment, since the polarization plane of the polarization multiplexed optical signal is not controlled in the receiving side, the optical signals X and Y output from the polarization beam splitter 221 include both components of the optical signals H and V in the transmitting side respectively. The local oscillation light generation unit 223 is, for example, a distributed feedback laser diode and outputs continuous-wave light. The optical receiving unit 224 detects the optical signals X and Y by homodyne detection using the continuous-wave light generated by the local oscillation light generation unit 223 (hereinafter, local oscillation light), and converts them into baseband signals X and Y. And then, the optical receiving unit 224 generates, from the baseband signals X and Y, a baseband signal H corresponding to the transmission data of the optical transmission device 211 and a baseband signal V corresponding to the transmission data of the optical transmission device 212, performs demodulation processing, and then outputs them as received data.

<The Configuration and Operation of the Optical Transmission Device in Accordance with the Second Exemplary Embodiment>

Figure 3:
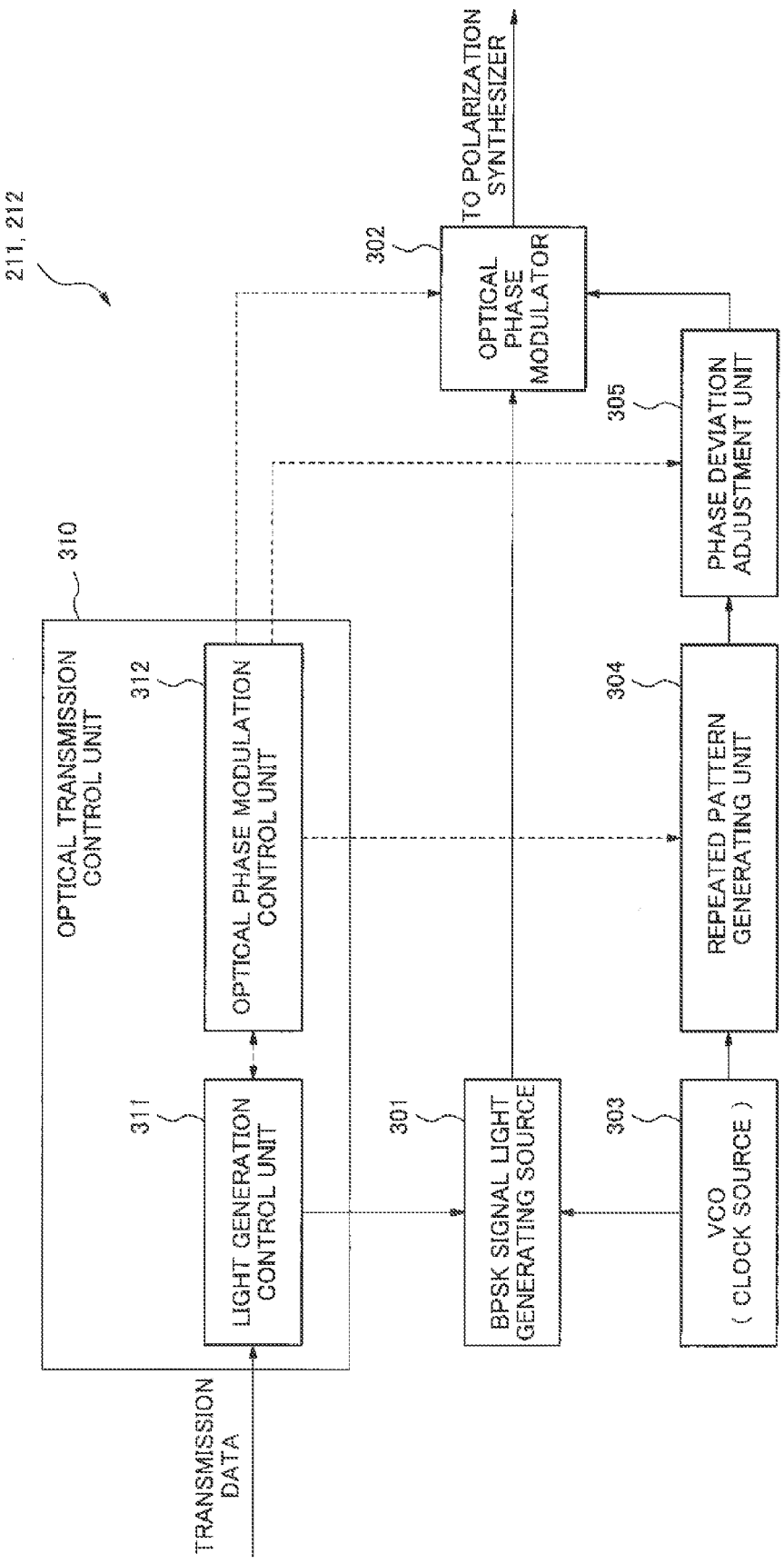
FIG. 3 is a block diagram showing a configuration of an optical transmission device in accordance with the second exemplary embodiment of the present invention.

First, the configuration and operation of the optical transmission device 211, 212 in the receiving side in accordance with the second exemplary embodiment will be described. FIG. 3 is a block diagram showing a configuration of the optical transmission device 211, 212 of the second exemplary embodiment.

According to FIG. 3, the optical transmission device 211, 212 includes a BPSK signal light generating source 301, an optical phase modulator 302, a VCO (Voltage Controlled Oscillator) 303 as a clock source, a repeated pattern generating unit 304, a phase deviation adjustment unit 305, and an optical transmission control unit 310. The optical transmission control unit 310 includes a light generation control unit 311 and an optical phase modulation control unit 312.

The transmission data input into the optical transmission device 211, 212 are converted into signals for generating BPSK signal light in the light generation control unit 311. Such processing is known and the description is omitted. The BPSK signal light is generated from the BPSK signal light generating source 301 depending on the signal from the light generation control unit 311 and the clock signal from the VCO 303. The BPSK signal light is input into the optical phase modulator 302, and the optical phase of it is modulated into pseudo QPSK signal light.

A clock signal deriving from the clock signal generated in the VCO 303 is input into the optical phase modulator 302 through the repeated pattern generating unit 304 and the phase deviation adjustment unit 305. Based on this clock signal, the optical phase of the BPSK signal light is modulated by the phase deviation quantity of $\pi/2$ substantially and is output.

(Optical Phase Modulation by the Optical Phase Modulator)

Figure 4:
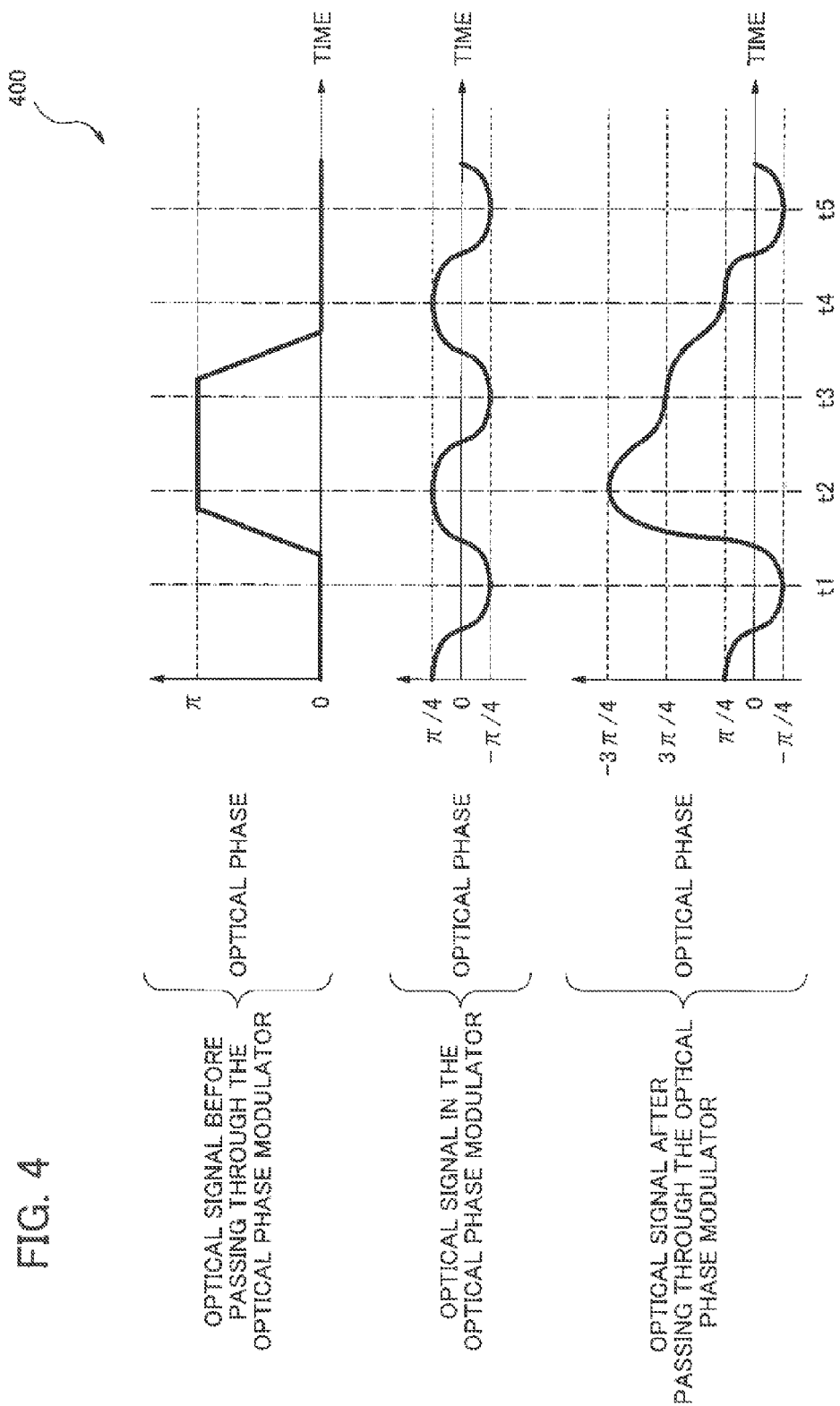
FIG. 4 is a diagram showing the phase time deviation of an optical signal before passing through an optical phase modulator, a phase modulation signal of the optical phase modulator, and an optical signal after passing through the optical phase modulator in the second exemplary embodiment of the present invention.

FIG. 4 is a figure showing the phase time deviation 400 of an optical signal before passing through the optical phase modulator, an optical phase modulation signal in the optical phase modulator, and an optical signal after passing through the optical phase modulator, in the second exemplary embodiment.

The BPSK signal light which is output from the BPSK signal light generating source 301 and is input into the optical phase modulator 302 is a signal like one in the top of FIG. 4, for example. The signal input from the phase deviation adjustment unit 305 into the optical phase modulator 302 is arranged, as shown in the middle of FIG. 4, so that optical phase modulation may be repeated alternately between $-\pi/4$ and $+\pi/4$ synchronizing with the clock signal from the VCO 303. And then, from the optical phase modulator 302, as shown in the bottom of FIG. 4, the pseudo QPSK signal light is output in which $[-\pi/4$ or $+3\pi/4]$ and $[+\pi/4$ or $-3\pi/4]$ appear alternately synchronizing with the clock signal from the VCO 303.

Figure 5:
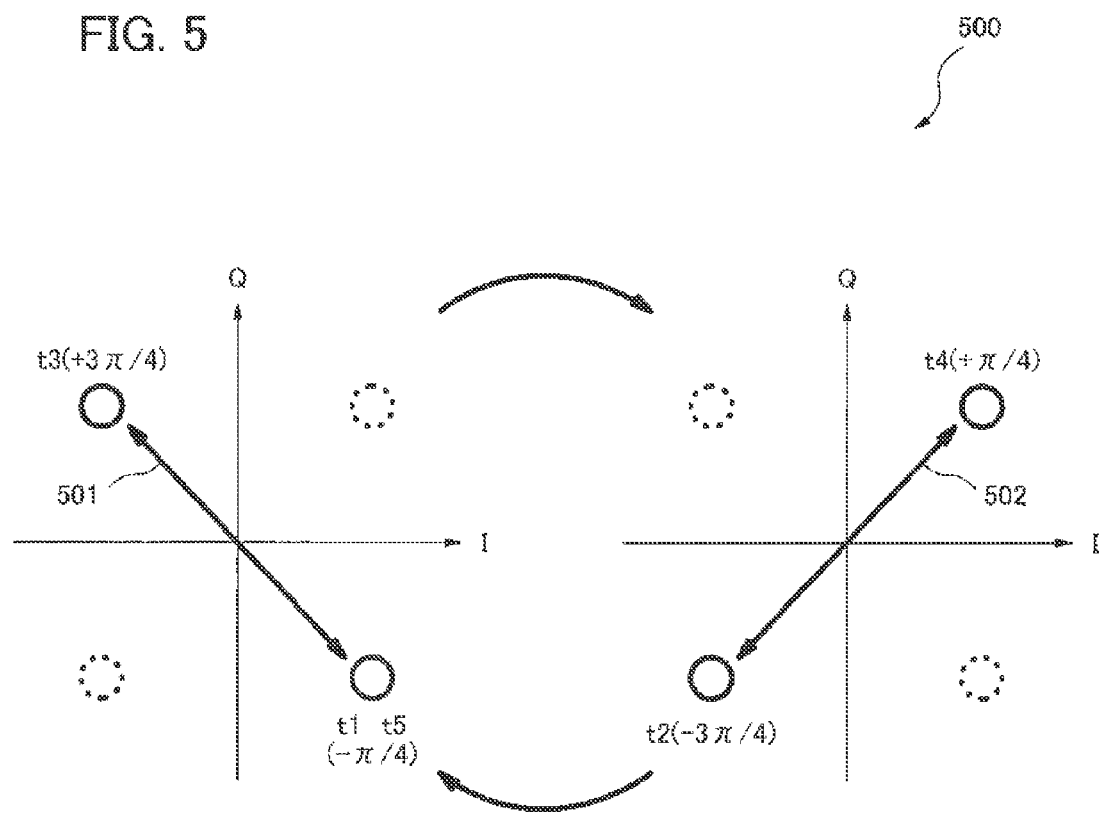
FIG. 5 is a diagram showing the constellation of a pseudo QPSK signal by optical phase modulation in the second exemplary embodiment of the present invention.

FIG. 5 is a figure showing the constellation 500 of the pseudo QPSK signal by the optical phase modulation. The symbols of t1 to t5 in FIG. 5 correspond to the symbols of t1 to t5 in FIG. 4. As shown by 501 and 502 in FIG. 5, since the Euclidean distance on the constellation of the pseudo QPSK signal light output from the optical phase modulator 302 is the same as that of the BPSK signal before the optical phase modulation, OSNR (Optical Signal to Noise Ratio) robustness does not change. The optical phase modulator 302 of the present exemplary embodiment is realized by giving a phase shift of $7\pi/4$ in the subsequent stage of the optical phase modulator such as an LN optical modulator, for example.

The optical transmission devices 211 and 212 generate the pseudo QPSK signals by the above-mentioned method so that the polarization of the optical signal H and the optical signal V may become orthogonal to each other.

(Specific Example of the Optical Phase Modulator)

An example of the optical modulator available for the above-mentioned optical phase modulator 302 will be described. The optical phase modulator 302 is not limited to the present example.

Figure 6:
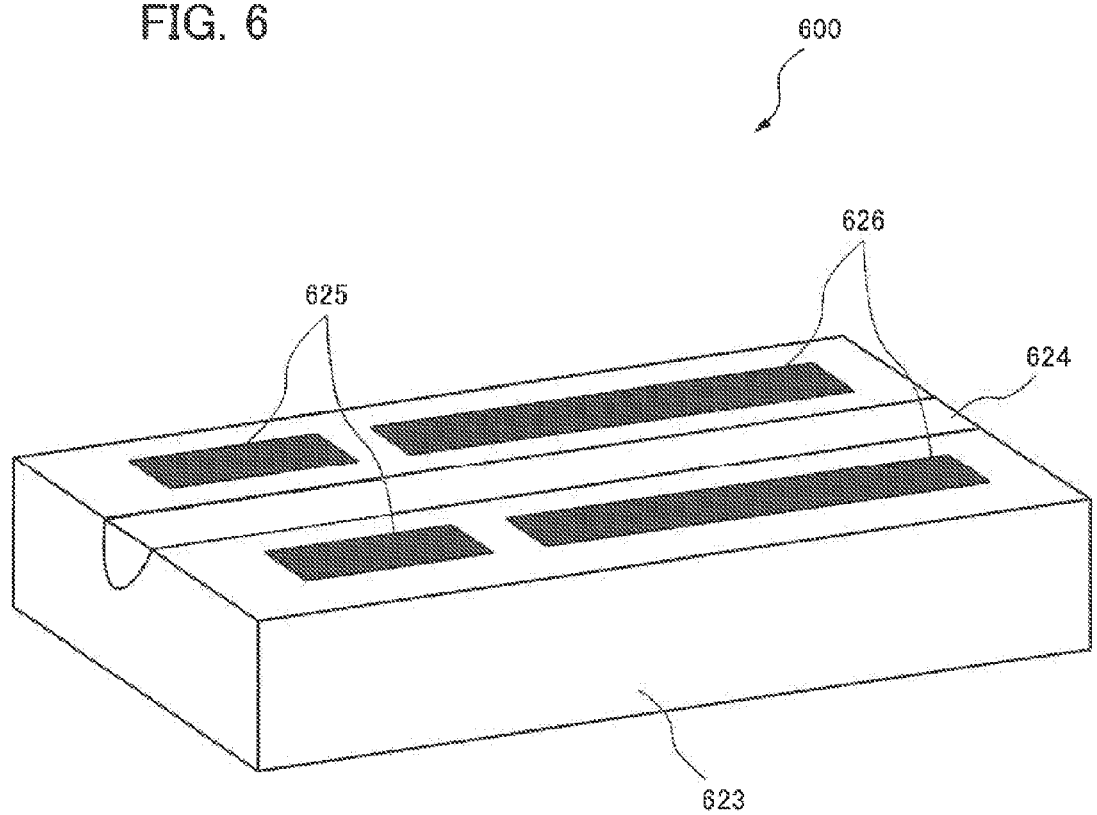
FIG. 6 is a view showing an optical modulator which is an example of the optical phase modulator of the second exemplary embodiment of the present invention.

FIG. 6 is a figure showing an optical modulator 600 of an example of the optical phase modulator in the second exemplary embodiment. The optical modulator 600 shown in FIG. 6 includes a substrate 623, an optical waveguide 624 formed on the surface of the substrate 623, and electrode pairs 625, 626 to make a phase of the light in the optical waveguide 624 transit.

The substrate 623 is made of any one of a nonlinear crystal such as $LiTaO_3$, $LiNbO_3$, and $Ba_2NaNbO_{15}$, a semiconductor composed of a single body or a combination of two or more of Si, Ge, Ga, As, In, P, N and Al, polyimide system resin, polyamide system resin, and polyether-base resin. The optical waveguide 624 is formed on a surface of the substrate 623 by the thermal diffusion method or the ion implantation method. The electrode pairs 625, 626 are composed of single or two or more kinds of chemical elements. The length of the above-mentioned electrode pairs 625, 626 is determined as follows, if the combination of phases in optical modulation to be repeated alternately is a set of $-\pi/4$ and $+\pi/4$. That is to say, the length of the electrode pair 625 is set so that the phase may change by $+\pi/4$ at the modulation voltage Vm, and the length of the electrode pair 626 is set so that the phase may change by $-\pi/4$ at the same modulation voltage Vm as mentioned above.

Using the optical modulator 600 in FIG. 6 as the optical phase modulator 302 in FIG. 3, a clock signal deriving from the clock signal generated by the VCO 303 is input through the repeated pattern generating unit 304 and the phase deviation adjustment unit 305. By applying alternately the same modulation voltage Vm to each of the electrode pairs 625, 626 based on the clock signal, it is possible to make the modulation light in which the phase of the BPSK modulation signal light is modulated by the phase deviation quantity of $\pi/2$ substantially, and to generate the pseudo QPSK signal light.

It is necessary to change the above-mentioned length of the electrode pairs 625, 626 appropriately depending on the combination of phases in the optical modulation to be repeated alternately. For example, if the combination of phases in the optical modulation to be repeated alternately is a set of $[+3\pi/4$ and $-3\pi/4]$, it is necessary to set the length of the electrode pair 625 so that the phase may change by $+3\pi/4$ at the modulation voltage Vm, and to set the length of the electrode pair 626 so that the phase may change by $-3\pi/4$ at the same modulation voltage Vm.

(Operation Procedures of the Optical Transmission Device)

Figure 7:
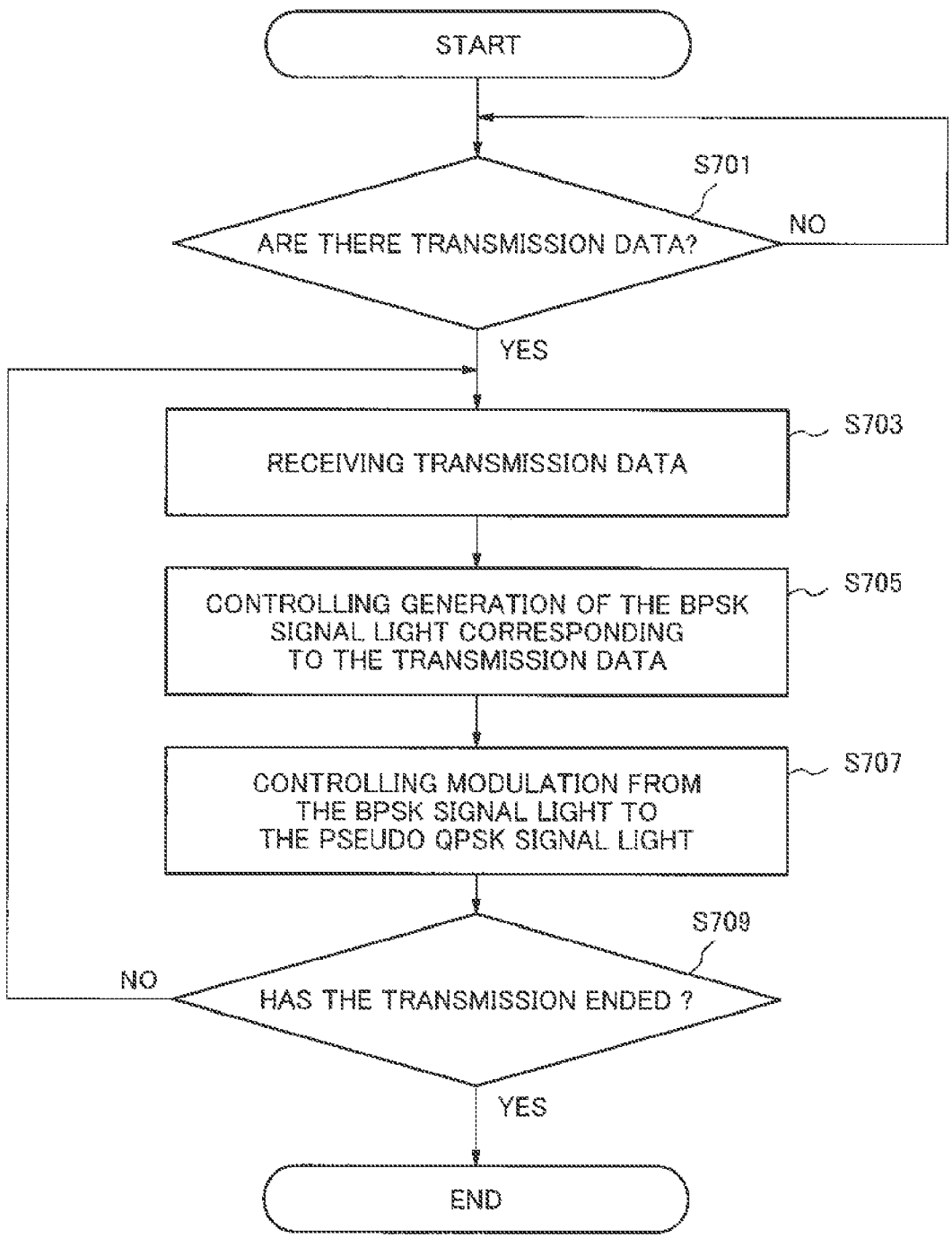
FIG. 7 is a flowchart showing processing procedures of the optical transmission device in accordance with the second exemplary embodiment of the present invention.

FIG. 7 is a flowchart showing processing procedures of the optical transmission device in accordance with the second exemplary embodiment. This flowchart is carried out by a CPU, which is not illustrated, in the optical transmission control unit 310 shown in FIG. 3, and each functional configuration unit in the optical transmission device is controlled or realized.

In the step S701, it is determined whether there are transmission data. If there are transmission data, the step proceeds to the step S703, and transmission data are received. Next, in the step S705, generation of the BPSK signal light which corresponds to the transmission data in the BPSK signal light generating source 301 is controlled. And, in the step S707, the control is performed that the optical phase of the BPSK signal light generated in the BPSK signal light generating source 301 is modulated by the optical phase modulator 302, and is changed into that of the pseudo QPSK signal light. An end of transmission is determined in the step S709, if not end, the step returns to the step S703 and the steps are repeated from S703 to S707.

<Configuration and Operation of the Optical Receiving Device in Accordance with the Second Exemplary Embodiment>

Next, the configuration and operation of the optical receiving device 222 of the second exemplary embodiment will be described.

Figure 8:
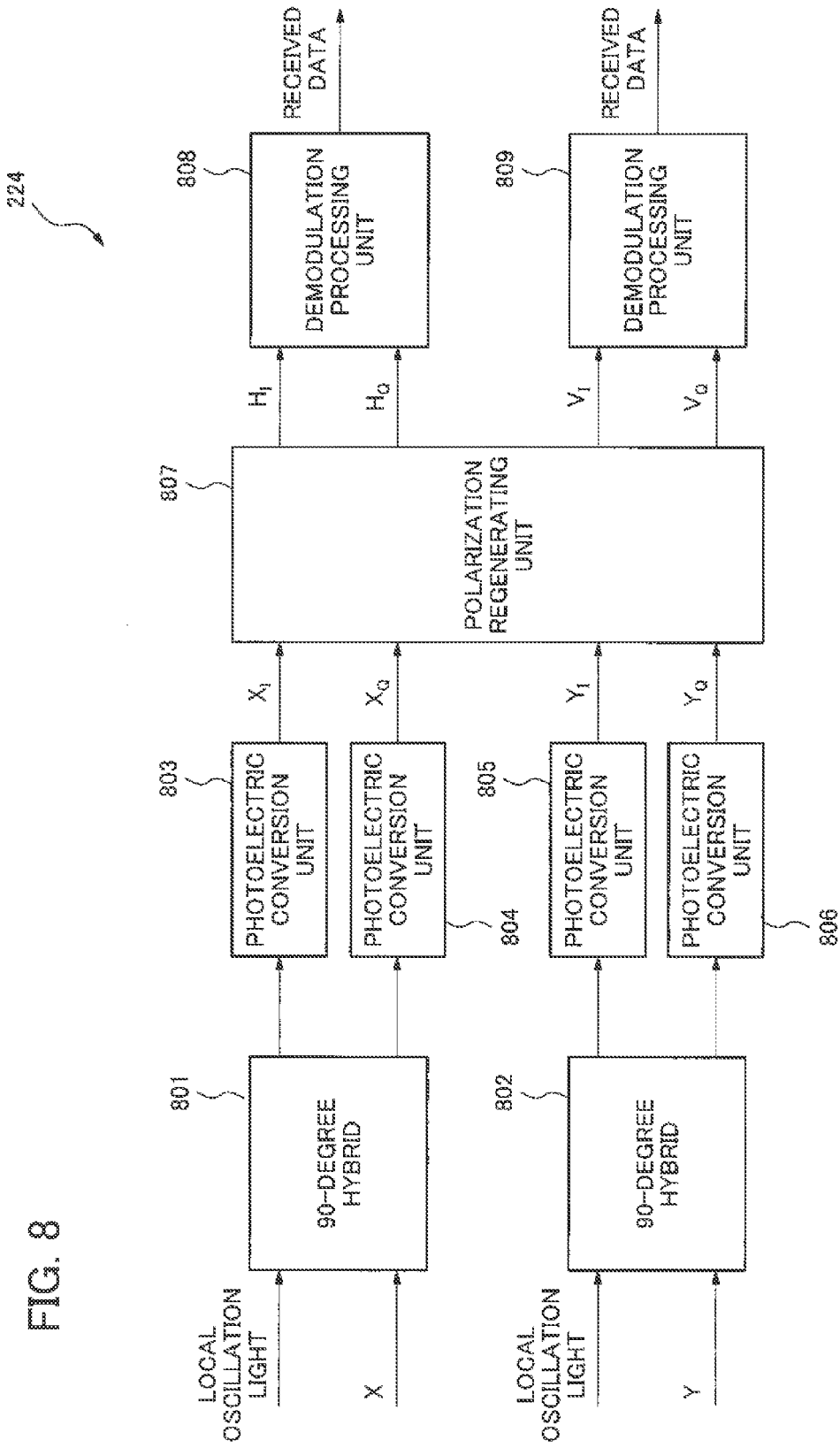
FIG. 8 is a block diagram showing a configuration of an optical receiving unit in accordance with the second exemplary embodiment of the present invention.

FIG. 8 is a block diagram showing the configuration of the optical receiving unit 224 in the optical receiving device 222. Since the local oscillation light generation unit 223 is well known, its description in detail is omitted. According to FIG. 8, the optical receiving unit 224 includes 90-degree hybrids 801 and 802, photoelectric conversion units 803 to 806, a polarization regenerating unit 807, and demodulation processing units 808 and 809.

The 90-degree hybrid 801 receives the optical signal X and the local oscillation light, and outputs the optical signals corresponding to an in-phase component and a quadrature component respectively. The photoelectric conversion unit 803 receives the optical signal corresponding to the in-phase component of the optical signal X, converts it into an electric signal, and outputs the in-phase baseband signal $X_I$. The photoelectric conversion unit 804 receives the optical signal corresponding to the quadrature component of the optical signal X, converts it into an electric signal, and outputs the quadrature baseband signal $X_Q$. Similarly, the 90-degree hybrid 802 receives the optical signal Y and the local oscillation light, and outputs the optical signals corresponding to an in-phase component and a quadrature component respectively. The photoelectric conversion unit 805 receives the optical signal corresponding to the in-phase component of the optical signal Y, converts it into an electric signal, and outputs the in-phase baseband signal $Y_I$. The photoelectric conversion unit 806 receives the optical signal corresponding to the quadrature component of the optical signal Y, converts it into an electric signal, and outputs the quadrature baseband signal $Y_Q$.

The polarization regenerating unit 807 receives each baseband signal $X_I$, $X_Q$, $Y_I$, $Y_Q$, and based on a signal component included in each, detects the difference between the reference axis of the polarization beam splitter 221 shown in FIG. 2 and the polarization plane of the received polarization multiplexed optical signal. In other words, it detects the difference between the polarization planes of the optical signals X and Y which are output from the polarization beam splitter 221 in FIG. 2 and those of the optical signals H and V which are included in the polarization multiplexed optical signal received by the polarization beam splitter 221. More specifically, the detected differences are expressed as filter coefficients of $k_{xx}$, $k_{xy}$, $k_{yx}$, and $k_{yy}$. And, the polarization regenerating unit 807 regenerates, based on the detected differences, the in-phase baseband signal $H_I$ and the quadrature baseband signal $H_Q$ corresponding to the transmission data from the optical transmission device 211, and the in-phase baseband signal $V_I$ and the quadrature baseband signal $V_Q$ corresponding to the transmission data from the optical transmission device 212.

The demodulation processing unit 808 performs demodulation processing for the in-phase baseband signal $H_I$ and the quadrature baseband signal $H_Q$, and extracts the received data corresponding to the transmission data transmitted by the optical transmission device 211. On the other hand, the demodulation processing unit 809 performs demodulation processing for the in-phase baseband signal $V_I$ and the quadrature baseband signal $V_Q$, and extracts the received data corresponding to the transmission data transmitted by the optical transmission device 212.

(Configuration and Operation of the Polarization Regenerating Unit)

Figure 9:
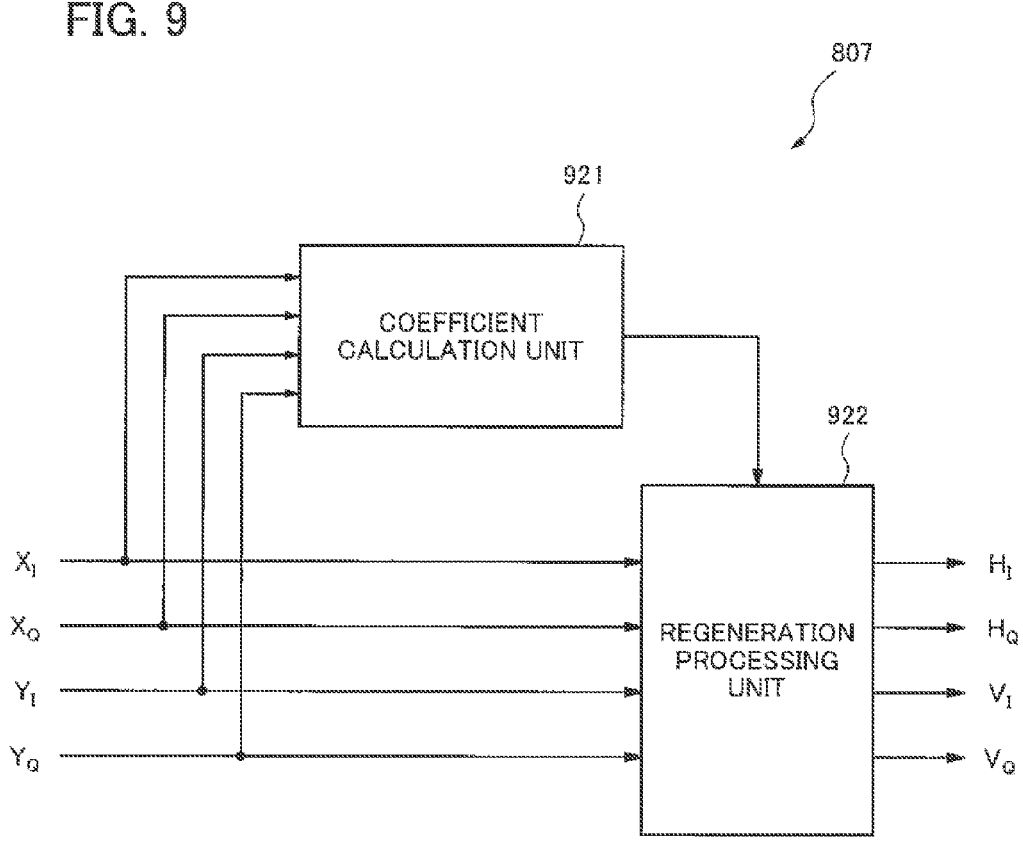
FIG. 9 is a block diagram showing a configuration of a polarization regenerating unit in accordance with the second exemplary embodiment of the present invention.

FIG. 9 is a block diagram showing the configuration of the polarization regenerating unit 807. According to FIG. 9, the polarization regenerating unit 807 includes a coefficient calculation unit 921 and a regeneration processing unit 922.

The coefficient calculation unit 921 calculates the filter coefficients $k_{xx}$, $k_{xy}$, $k_{yx}$, and $k_{yy}$ from the input signals $X_I$, $X_Q$, $Y_I$, and $Y_Q$. The regeneration processing unit 922 outputs the in-phase baseband signal $H_I$, the quadrature baseband signal $H_Q$, the in-phase baseband signal $V_I$, and the quadrature baseband signal $V_Q$ from the input signals $X_I$, $X_Q$, $Y_I$, and $Y_Q$ using the calculated filter coefficients $k_{xx}$, $k_{xy}$, $k_{yx}$, and $k_{yy}$.

The coefficient calculation unit 921 calculates each filter coefficient using the algorithm employed in non patent literature 1, for example, CMA (Constant Modulus Algorithm). As an example, the filter coefficient is calculated so that the errors $\epsilon_x$ and $\epsilon_y$ expressed in the following formulae may be minimized.

$$\epsilon_x = 1 - |h|^2$$

$$\epsilon_y = 1 - |v|^2$$

Here, h and v are complex numbers expressed in $h=(k_{xx} \times X + k_{xy} \times Y)$, and $v=(k_{yx} \times X + k_{yy} \times Y)$, respectively. X and Y represent complex representations of the extracted signal components, that is, $X = X_I + jX_Q$ and $Y = Y_I + jY_Q$. Here, j represents a pure imaginary number.

The regeneration processing unit 922 calculates complex signals H and V by $H=(k_{xx} \times X + k_{xy} \times Y)$ and $V=(k_{yx} \times X + k_{yy} \times Y)$ using the filter coefficients $k_{xx}$, $k_{xy}$, $k_{yx}$, and $k_{yy}$ obtained by the coefficient calculation unit 921. And, a real part and an imaginary part of the complex signal H are output as the in-phase baseband signal $H_I$ and the quadrature baseband signal $H_Q$, respectively. Also, a real part and an imaginary part of the complex signal V are output as the in-phase baseband signal $V_I$ and the quadrature baseband signal $V_Q$, respectively.

That is to say, the coefficient calculation unit 921 calculates the filter coefficients so that the amplitude of the extracted signal component may be converted into constant amplitude, and the regeneration processing unit 922 regenerates the baseband signal H and the baseband signal V by using the calculated filter coefficients.

However, a phase rotates because there is the possibility of phase noise of the local oscillation light in optical synchronous detection and relative frequency fluctuation and the like between the local oscillation light and the optical signal in the transmitting side, for example. However, by further converting the signal so as to stop the rotation, it is possible to compensate the phase noise of the local oscillation light in optical synchronous detection and the relative frequency fluctuation and the like between the local oscillation light and the optical signal in the transmitting side. Specifically, it is performed to stop the phase rotation by means of a carrier phase estimation and to locate the complex signal of the baseband signal H and the baseband signal V regenerated by the calculated filter coefficients at a predetermined point on the complex plane. As an example of the technology to stop the phase rotation by means of the carrier phase estimation, there is a "Feed Forward M-th Power Algorithm" described in the following reference literature.

[Reference literature]: S. Tsukamoto, et al., "Coherent Demodulation of Optical Multilevel Phase-Shift-Keying Signals Using Homodyne Detection and Digital Signal Processing", IEEE PHOTONICS TECHNOLOGY LETTERS, VOL. 18, NO. 10, May 15, 2006.

(Configuration and Operation of the Demodulation Processing Unit)

The received data are extracted by performing symbol decision in the demodulation processing units 808 and 809 respectively from the in-phase baseband signal $H_I$, the quadrature baseband signal $H_Q$, the in-phase baseband signal $V_I$, and the quadrature baseband signal $V_Q$ which have been regenerated in the polarization regenerating unit 807. The symbol decision is performed by a positional relationship between a decision level set on the constellation and a signal.

FIG. 10A to FIG. 10D are figures showing the decision level on the constellation in the symbol decision which is used in the demodulation processing units 808 and 809.

Figure 10A:
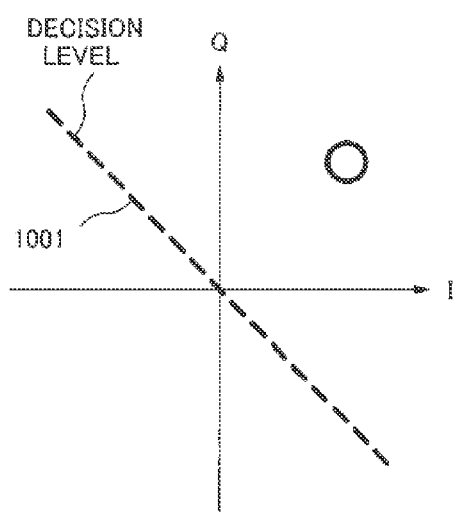
FIGS. 10A to 10D are diagrams showing decision levels on the constellations in symbol decision used in a demodulation processing unit in accordance with the second exemplary embodiment of the present invention.
Figure 10B:
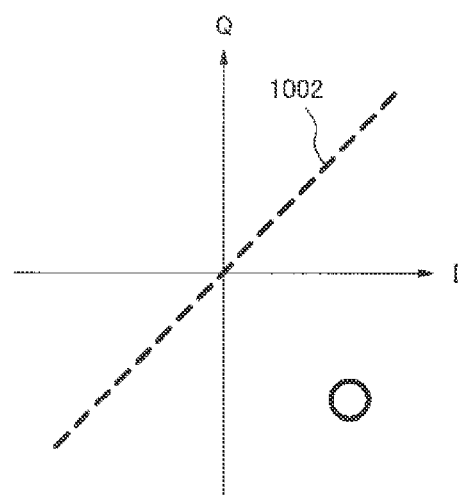
Figure 10C:
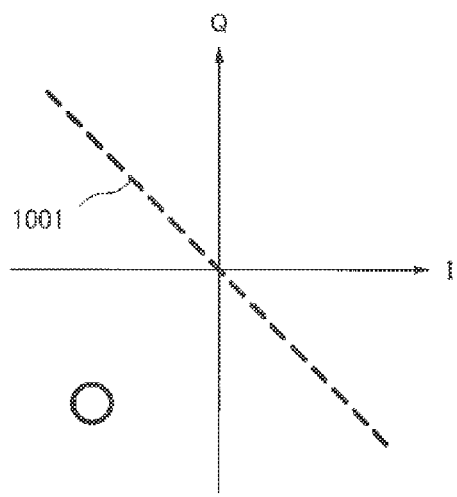
Figure 10D:
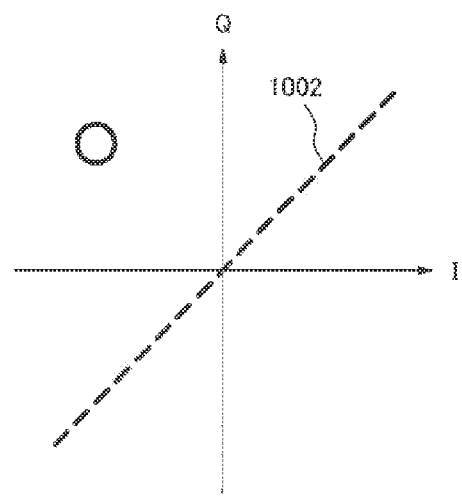

For example, if a signal appears in the first quadrant or the third quadrant on the constellation as shown in FIG. 10A and FIG. 10C, straight line 1001 which rotates by $+3\pi/4$ from I axis is set for the decision level in the symbol decision. On the other hand, as shown in FIG. 10B and FIG. 10D, if a signal appears in the second quadrant or the fourth quadrant on the constellation, straight line 1002 which rotates by $+\pi/4$ from I axis is set. In the present exemplary embodiment, $+\pi/4$ or $-\pi/4$ is judged as a space (0), and $+3\pi/4$ or $-3\pi/4$ is judged as a mark (1). It is also acceptable to rotate the decision level by $\pi/2$ in advance every time that the symbol decision is performed.

Here, the symbol decision will be described specifically taking the results of the optical phase modulation shown in the bottom of FIG. 4 as an example. Since the signal at the time t1 appears in the fourth quadrant on the constellation (refer to FIG. 10B), the symbol decision is performed by using the straight line 1002 which has rotated by $+\pi/4$ from I axis as the decision level, and is demapped onto a space (0). Since the signal at the next time t2 appears in the third quadrant on the constellation (FIG. 10C), the symbol decision is performed by using the straight line 1001 which has rotated by $+3\pi/4$ from I axis as the decision level, and is demapped onto a mark (1). And, since the decision level at the time t1 is the straight line which has rotated by $+\pi/4$ from I axis, it is also acceptable to set the straight line which has rotated by +3π/4 from I axis for the decision level at the time t2 by rotating the decision level at the time t1 by π/2 in advance, and then to perform the symbol decision.

However, since phase rotation arises due to the influence of operating conditions at the transmission, and polarization demultiplexing and phase estimation at the reception, +π/4 or −π/4 does not always correspond to a space (0) and +3π/4 or −3π/4 does not always correspond to a mark (1). That is to say, a mapping becomes any one of those shown in FIG. 11A to FIG. 11H. Therefore, the reception mapping is determined from any one of FIG. 11A to FIG. 11H by data verification by means of BER (Bit Error Rate) measurements for training signals, for example.

The present exemplary embodiment is not limited to the homodyne detection, but it is also applicable to the heterodyne detection. In this case, the optical signals X and Y are mixed with the local oscillation light respectively, and then photoelectrically converted into an intermediate frequency band signal corresponding to the optical signal X and an intermediate frequency band signal corresponding to the optical signal Y. And, an IQ multiplexed signal corresponding to the transmission data from the optical transmission device 211 and an IQ multiplexed signal corresponding to the transmission data from the optical transmission device 212 are regenerated based on signal components included in the respective intermediate frequency band signals.

In the present exemplary embodiment, the case has been described where the optical phase modulation synchronizing with the clock signal from the VCO 303 in the optical phase modulator 302 is repeated alternately between −π/4 and +π/4. However, the pseudo QPSK signal light can be similarly generated by repeating +π/4 and +3π/4 alternately, repeating −3π/4 and +3π/4 alternately, or repeating −3π/4 and −π/4 alternately.

If +π/4 and +3π/4 are repeated alternately, the optical phase modulator 302 is realized by applying a phase shift of π/4 in the subsequent stage of an optical phase modulator such as a LN (lithium niobate) optical modulator. If −3π/4 and +3π/4 are repeated alternately, it is realized by applying a phase shift of 3π/4 in the subsequent stage of an optical phase modulator such as the LN optical modulator. If −3π/4 and −π/4 are repeated alternately, it is realized by applying a phase shift of 5π/4 in the subsequent stage of an optical phase modulator such as the LN optical modulator.

If data are restored by the demodulation processing units 808 and 809 from the in-phase baseband signal $H_I$, the quadrature baseband signal $H_Q$, the in-phase baseband signal $V_I$, and the quadrature baseband signal $V_Q$ which are regenerated by the polarization regenerating unit 807, the following are performed. If +π/4 and +3π/4 are repeated alternately, the symbol decision is performed in which +π/4 and +3π/4 are judged as a space and −π/4 and −3π/4 are judged as a mark. If −3π/4 and +3π/4 are repeated alternately, the symbol decision is performed in which −3π/4 and +3π/4 are judged as a space and −π/4 and +π/4 are judged as a mark. If −3π/4 and −π/4 are repeated alternately, the symbol decision is performed in which −3π/4 and −π/4 are judged as a space and +π/4 and +3π/4 are judged as a mark.

<Control Configuration and Operation Procedures of the Optical Receiving Unit>

Hereinafter, an example of a hardware configuration and operation procedures of a control unit will be shown in the case that a part of the optical receiving unit 224 is realized by software.

(Hardware Configuration of a Control Unit in the Optical Receiving Unit)

FIG. 12 is a block diagram showing a hardware configuration of the control unit in the optical receiving unit 224 in accordance with the second exemplary embodiment. In particular, the polarization regenerating unit 807 and the demodulation processing units 808, 809 can be realized by software processing.

In FIG. 12, a CPU 1210 is a processor for calculation control, and realizes each functional configuration unit in FIG. 8 or FIG. 9 by executing a program. A ROM 1220 stores initial data, fixed data such as a program and the like, and a program.

A RAM 1240 is a random access memory which the CPU 1210 uses as a work area of the temporary memory. The RAM 1240 reserves an area for memorizing data necessary to realize the present exemplary embodiment and an area for memorizing a report program. 1241 in FIG. 12 represents the data $X_I$, $X_Q$, $Y_I$, and $Y_Q$ which are input from the photoelectric conversion units 803-806 through an input interface 1260. 1242 represents the calculated filter coefficients of $k_{xx}$, $k_{xy}$, $k_{yx}$, and $k_{yy}$. 1243 represents the in-phase baseband signal $H_I$ and the quadrature baseband signal $H_Q$ of the horizontal polarization calculated by the data $X_I$, $X_Q$, $Y_I$, and $Y_Q$ and the filter coefficients $k_{xx}$, $k_{xy}$, $k_{yx}$, and $k_{yy}$. 1244 represents the in-phase baseband signal $V_I$ and the quadrature baseband signal $V_Q$ of the vertical polarization calculated by the data $X_I$, $X_Q$, $Y_I$, and $Y_Q$ and the filter coefficients $k_{xx}$, $k_{xy}$, $k_{yx}$, and $k_{yy}$. 1245 represents a decision level for the horizontal polarization H, and 1246 represents a decision level for the vertical polarization V. 1247 represents the restored received data of the horizontal polarization, and 1248 represents the restored received data of the vertical polarization. The restored received data of the horizontal polarization 1247 and the restored received data of the vertical polarization 1248 are output through an output interface 1270.

A storage 1250 in FIG. 12 is a large capacity storage device which stores in a non-volatile manner a database, various types of parameters and programs which the CPU 1210 executes. In the storage 1250, the following data or programs necessary to realize the present exemplary embodiment are stored.

1251 represents a coefficient calculation algorithm for calculating the filter coefficients $k_{xx}$, $k_{xy}$, $k_{yx}$, and $k_{yy}$. In the present exemplary embodiment, CMA is employed. 1252 represents a decision level memory unit shown in FIG. 11. The decision level is determined from it by data matching with BER measurements of training signals. In the present exemplary embodiment, the following programs are stored in the storage 1250. 1253 represents a main received data demodulation program which the optical receiving unit 224 executes (refer to FIG. 13). 1254 represents a coefficient calculation module for calculating filter coefficients, which is included in the received data demodulation program 1253. 1255 represents a regeneration processing module for regenerating the in-phase and quadrature phase signals for each polarization using the filter coefficients, which is included in the received data demodulation program 1253. 1256 represents a demodulation processing module for demodulating the received data corresponding to the transmission data from the in-phase and quadrature phase signals, which is included in the received data demodulation program 1253.

In FIG. 12, only data and programs indispensable to the present exemplary embodiment are shown, and general-purpose data and programs such as OS are not illustrated.

(Processing Procedures of the Control Unit in the Optical Receiving Unit)

Figure 13:
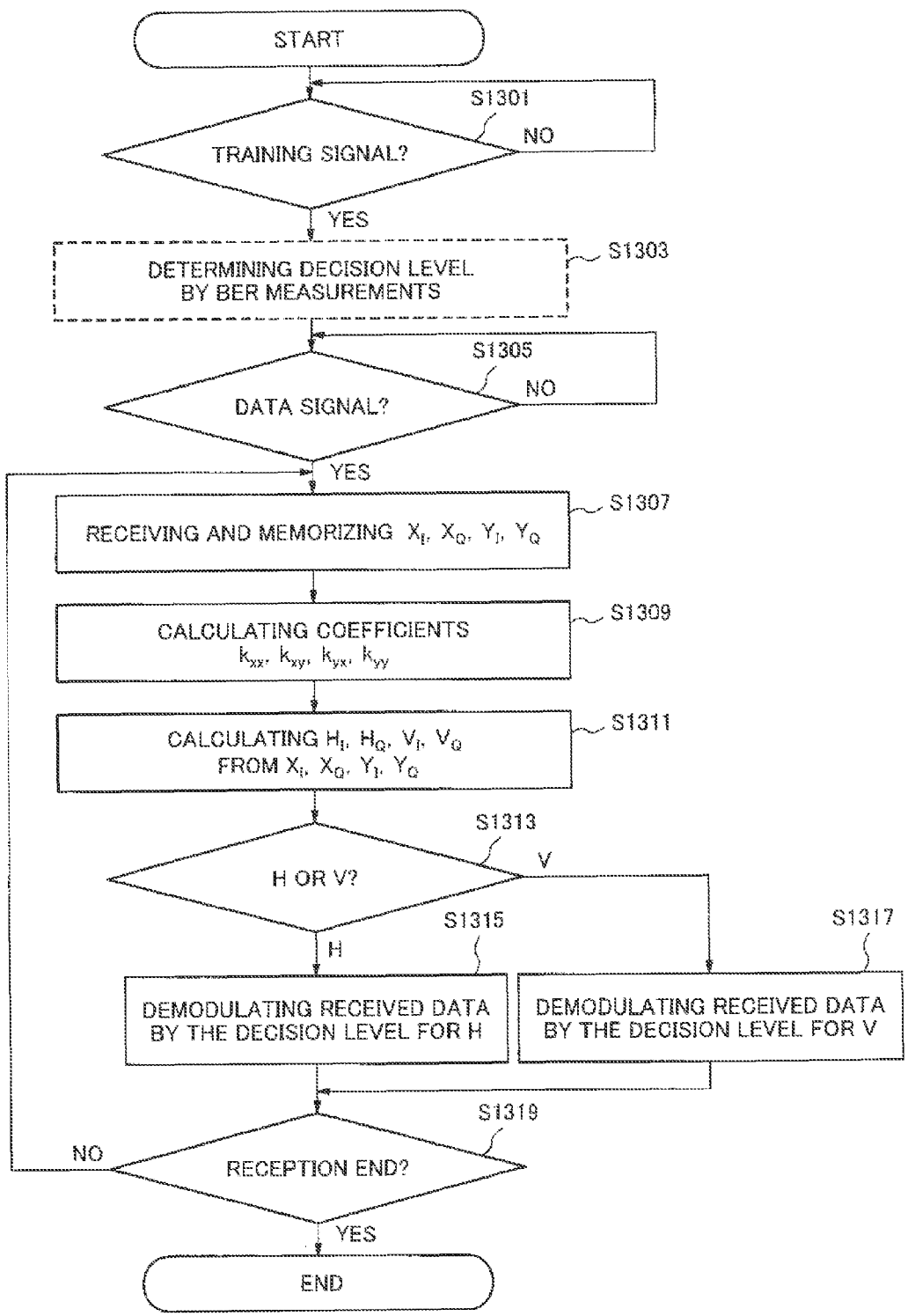
FIG. 13 is a flowchart showing processing procedures of the control unit in the optical receiving unit in accordance with the second exemplary embodiment of the present invention.

FIG. 13 is a flowchart showing processing procedures of the control unit in the optical receiving unit. This flowchart is executed in the CPU 1210 in FIG. 12, and the functional configuration units shown in FIG. 8 and FIG. 9 are controlled or realized.

First, in step S1301, a training signal is watched. If the training signal is received, optionally in step S1303, the decision level is determined by BER measurements. In the case that the decision level has been set in advance, step S1303 is skipped.

In step S1305, a data signal is watched. If the data signal is received, the process proceeds to step S1307, and the data $X_I$, $X_Q$, $Y_I$, and $Y_Q$ are received and memorized. Next, in step S1309, the filter coefficients $k_{xx}$, $k_{xy}$, $k_{yx}$, and $k_{yy}$ are calculated by using the coefficient calculation algorithm 1251. In step S1311, the in-phase baseband signal $H_I$ and the quadrature baseband signal $H_Q$ of horizontal polarization, and the in-phase baseband signal $V_I$ and the quadrature baseband signal $V_Q$ of vertical polarization are calculated based on the data $X_I$, $X_Q$, $Y_I$, and $Y_Q$ and the filter coefficients $k_{xx}$, $k_{xy}$, $k_{yx}$, and $k_{yy}$.

In step S1313, it is judged whether the demodulation is for H (horizontal polarization) or for V (vertical polarization). If the demodulation is for H, the process proceeds to step S1315 and the received data are demodulated from the in-phase baseband signal $H_I$ and the quadrature baseband signal $H_Q$ of horizontal polarization using the decision level for H. If the demodulation is for V, the process proceeds to step S1317 and the received data are demodulated from the in-phase baseband signal $V_I$ and the quadrature baseband signal $V_Q$ of vertical polarization using the decision level for V. In step S1319, it is judged whether the receiving process has finished. If it has not finished, the process returns to step S1307 and repeats the steps from S1307 to S1317.

[Modification of the Second Exemplary Embodiment]

In the above-mentioned second exemplary embodiment, each optical phase modulator 302 in the optical transmission devices 211 and 212 repeats the same optical phase modulation. However, it is also acceptable to repeat different modulation patterns in the optical phase modulator 302 between the optical transmission devices 211 and 212.

For example, the optical transmission device 211 shown in FIG. 2 repeats the modulation pattern of $-\pi/4$ and $+\pi/4$ alternately, and the optical transmission device 212 repeats the modulation pattern of $-3\pi/4$ and $-\pi/4$ alternately. In this case, the optical phase modulator 302 in the optical transmission device 211 is configured to apply a phase shift of $7\pi/4$ in the subsequent stage of an optical phase modulator such as an LN optical modulator. On the other hand, in the optical transmission device 212, it is configured to apply a phase shift of $5\pi/4$ in the subsequent stage of an optical phase modulator such as an LN optical modulator. The modulation pattern repeated in the optical phase modulator 302 is any of the pattern of repeating $-\pi/4$ and $+\pi/4$ alternately, the pattern of repeating $+\pi/4$ and $+3\pi/4$ alternately, the pattern of repeating $-3\pi/4$ and $+3\pi/4$ alternately, and the pattern of repeating $-3\pi/4$ and $-\pi/4$ alternately.

The Third Exemplary Embodiment

In the above-mentioned second exemplary embodiment, the optical phase of the BPSK signal light is modulated at the transmitting side and the BPSK signal light is converted into the pseudo QPSK signal light. In the third exemplary embodiment, the BPSK signal light is converted into the pseudo QPSK signal light by modulating the optical phase of the BPSK signal light at the receiving side. According to the present exemplary embodiment, it becomes possible to perform the polarization demultiplexing for the BPSK modulated optical signal in a low-cost and highly-reliable digital domain without changing or adding a circuit in the transmitting side. The same functional configuration units as those in FIG. 2 are given the same reference numbers. Since the functional configuration unit having the same name as that in FIG. 2 performs the similar function, details of its configuration and operation are omitted here. Accordingly, the disposition of the functional configuration units in the optical communication system will be mainly described below.

<Configuration of the Optical Communication System in Accordance with the Third Exemplary Embodiment>

Figure 14:
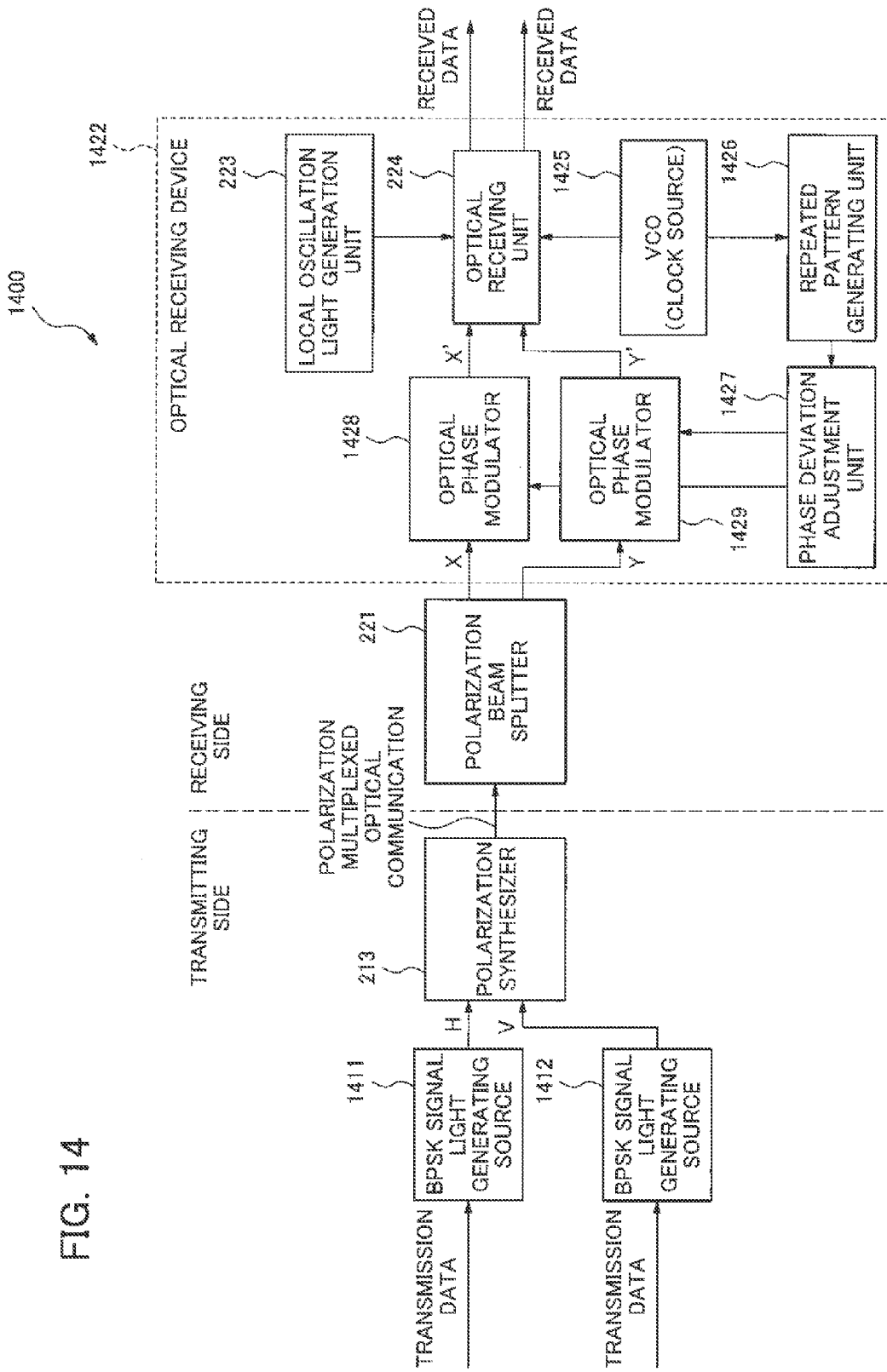
FIG. 14 is a block diagram showing a configuration of an optical communication system in accordance with the third exemplary embodiment of the present invention.

FIG. 14 is a block diagram showing the configuration of the optical communication system 1400 in accordance with the third exemplary embodiment. Although the optical transmission device and the optical receiving device are illustrated separately in FIG. 14, they are provided as an optical transmission and receiving device including the optical transmission device and the optical receiving device.

In FIG. 14, the transmitting side of the optical communication system 1400 includes BPSK signal light generating sources 1411 and 1412 and the polarization synthesizer 213. The BPSK signal light generating source 1411 and the BPSK signal light generating source 1412 are the same except that the polarization of output optical signals is different from each other by 90 degrees. The polarization synthesizer 213 performs polarization multiplexing of an optical signal H from the BPSK signal light generating source 1411 and an optical signal V from the BPSK signal light generating source 1412, and outputs them to the optical transmission path. Here, the polarization relationship between the optical signal H and the optical signal V is orthogonal.

On the other hand, the receiving side of the optical communication system 1400 includes the polarization beam splitter 221, the local oscillation light generation unit 223, the optical receiving unit 224, a VCO 1425 of a clock source, a repeated pattern generating unit 1426, a phase deviation adjustment unit 1427, and optical phase modulators 1428 and 1429. Here, although it is illustrated that the functional configuration units except for the polarization beam splitter 221 compose the optical receiving device 1422, it is not limited to this.

The polarization beam splitter 221 separates the polarization multiplexed optical signal received from the optical transmission path into an optical signal X and an optical signal Y whose polarizations are orthogonal to each other. In the present exemplary embodiment, since the polarization plane of the polarization multiplexed optical signal is not controlled in the receiving side, the optical signals X and Y output from the polarization beam splitter 221 include both components of the optical signals H and V in the transmitting side respectively.

The optical signal X and the optical signal Y output from the polarization beam splitter 221 are input into the optical phase modulators 1428 and 1429 respectively. A clock signal deriving from the clock signal generated in the VCO 1425 is input through the repeated pattern generating unit 1426 and the phase deviation adjustment unit 1427. Based on this clock signal, modulated light is generated by modulating the phase of the optical signal X and the optical signal Y from the polarization beam splitter 221 by the phase deviation quantity of $\pi/2$ substantially. The optical phase modulators 1428 and 1429 repeat optical phase modulation between $[-\pi/4]$ and

[+π/4] alternately synchronizing with the clock signal from the VCO 1425, as shown in the middle of FIG. 4.

The optical phase modulators 1428 and 1429 of the present exemplary embodiment are realized by providing a phase shift of 7π/4 for the subsequent stage of the optical phase modulator such as an LN optical modulator, for example. In this way, the BPSK signal light X, Y like one in the top of FIG. 4 passes through the optical phase modulators 1428 and 1429, and is modulated like one in the bottom of the figure and is output. The optical modulated output has been modulated into the pseudo QPSK signal light X' and Y' in which the phase repeatedly appears alternately [−π/4 or +3π/4] and [+π/4 or −3π/4] synchronizing with the clock signal from the VCO 1425.

Although the optical phase modulators 1428 and 1429 in the third exemplary embodiment can also be realized, for example, by the configuration like that shown in FIG. 6 in the second exemplary embodiment, it is not limited to this. Hereinafter, the demodulation in the optical receiving unit 224 is similar to a case where the signal light X and Y in the second exemplary embodiment is replaced by the signal light X' and Y' respectively.

The present exemplary embodiment is not limited to the homodyne detection, but it is also applicable to the heterodyne detection. In this case, the optical signals X' and Y' are mixed with the local oscillation light respectively, and then photoelectrically converted into an intermediate frequency band signal corresponding to the optical signal X' and an intermediate frequency band signal corresponding to the optical signal Y'. And, IQ multiplexed signals corresponding to the transmission data of the BPSK signal light generating sources 1411 and 1412 are regenerated based on signal components included in the respective intermediate frequency band signals. In the present exemplary embodiment, the optical phase modulation, which is performed in synchronization with the clock signal from the VCO 1425 in the optical phase modulators 1428 and 1429, is not limited to a method of repeating alternately between −π/4 and +π/4. That is to say, the pseudo QPSK signal light can be similarly generated by repeating +π/4 and +3π/4 alternately, repeating −3π/4 and +3π/4 alternately, or repeating −3π/and −π/4 alternately.

In this case, if +π/4 and +3π/4 are repeated alternately, the optical phase modulators 1428 and 1429 are realized by applying a phase shift of π/4 in the subsequent stage of an optical phase modulator such as an LN optical modulator. If −3π/4 and +3π/4 are repeated alternately, it is realized by applying a phase shift of 3π/4 in the subsequent stage of an optical phase modulator such as the LN optical modulator. If −3π/4 and −π/4 are repeated alternately, it is realized by applying a phase shift of 5π/4 in the subsequent stage of an optical phase modulator such as the LN optical modulator.

[Modification of the Third Exemplary Embodiment]

Next, a modification in the above-mentioned third exemplary embodiment will be described. It is also acceptable to repeat different modulation patterns between the optical phase modulators 1428 and 1429 shown in FIG. 14 in the third exemplary embodiment.

For example, the optical phase modulator 1428 shown in FIG. 14 repeats the modulation pattern of +π/4 and −3π/4 alternately, and the optical phase modulator 1429 repeats the modulation pattern of −3π/4 and +3π/4 alternately. In this case, the optical phase modulator 1428 is configured to apply a phase shift of π/4 in the subsequent stage of an optical phase modulator such as an LN optical modulator. On the other hand, in the optical phase modulator 1429, it is configured to apply a phase shift of 3π/4 in the subsequent stage of an optical phase modulator such as an LN optical modulator. The modulation pattern repeated in the optical phase modulators 1428 and 1429 is any of the pattern of repeating −π/4 and +π/4 alternately, the pattern of repeating +π/4 and +3π/4 alternately, the pattern of repeating −3π/4 and +3π/4 alternately, and the pattern of repeating −3π/4 and −π/4 alternately.

Other Exemplary Embodiments

Although the exemplary embodiments of the present invention have been described in detail above, the system or the device in which the individual features included in the respective exemplary embodiments are combined in various ways is also included in the scope of the present invention.

The present invention is available for a system composed of a plurality of apparatuses, and also available for a single device. Further, the present invention is also available for a case where the control program realizing the function of the exemplary embodiments is supplied to a system or a device directly or remotely. Accordingly, the present invention also includes in the scope, in order to realize the function of the present invention by a computer, a control program installed in the computer, a medium for storing the control program, and a WWW (World Wide Web) server from which the control program is downloaded.

[Other Descriptions of the Exemplary Embodiments]

The whole or part of the exemplary embodiments disclosed above can be described as, but not limited to, the following supplementary notes.

(Supplementary Note 1)

An optical communication system which communicates using polarization multiplexed optical signals comprising:
an optical phase modulation means which modulates phases of a plurality of optical signals employing BPSK modulation method which include information to be communicated, and thereby generates a plurality of optical signals to become pseudo QPSK modulation method; and
a signal restoration means which performs polarization demultiplexing of a plurality of polarization multiplexed optical signals from a plurality of optical signals modulated to the pseudo QPSK modulation method, and thereby restores the information to be communicated.

(Supplementary Note 2)

The optical communication system according to supplementary note 1, comprising:
a polarized wave synthesizing means which performs polarization multiplexing of the plurality of optical signals, and thereby outputs polarization multiplexed light to an optical transmission path; and
an optical separating means which separates the polarization multiplexed light inputted from the optical transmission path to a plurality of optical signals in which polarized waves are orthogonal each other, and
wherein the optical phase modulation means performs phase modulation of the plurality of optical signals employing the BPSK modulation method before polarization multiplexing by the polarized wave synthesizing means to modulate to the plurality of optical signals to become the pseudo QPSK modulation method, and
wherein the signal restoration means performs polarization demultiplexing of the polarization multiplexed optical signal from the plurality of optical signals to become the pseudo QPSK modulation method separated by the optical separating means, and thereby restores the information to be communicated.

(Supplementary Note 3)

The optical communication system according to supplementary note 1, comprising:

a polarized wave synthesizing means which performs polarization multiplexing of the plurality of optical signals, and thereby outputs polarization multiplexed light to an optical transmission path; and an optical separating means which separates the polarization multiplexed light inputted from the optical transmission path to a plurality of optical signals in which polarized waves are orthogonal each other, and wherein the optical phase modulation means performs phase modulation of the plurality of optical signals separated by the optical separating means to modulate to the plurality of optical signals to become the pseudo QPSK modulation method, and wherein the signal restoration means performs polarization demultiplexing of the polarization multiplexed optical signal using the plurality of optical signals to become the pseudo QPSK modulation method to which phase modulation having been performed by the optical phase modulation means, and thereby restores the information to be communicated.

(Supplementary Note 4)

The optical communication system according to supplementary note 2 or 3, wherein the signal restoration means includes a conversion means which performs synchronous detection of the plurality of optical signals to become the pseudo QPSK modulation method separated by the optical separating means using homodyne detection or heterodyne detection, and thereby converts to electric signals.

(Supplementary Note 5)

The optical communication system according to supplementary note 4, wherein the signal restoration means detects displacement of polarization planes of the polarization multiplexed light outputted to the optical transmission path and the polarization multiplexed light inputted from the optical transmission path based on the plurality of optical signals to become the pseudo QPSK modulation method separated by the optical separating means, and, based on the detected displacement, restores the information to be communicated from the electric signals converted by the conversion means.

(Supplementary Note 6)

The optical communication system according to supplementary note 4 or 5, wherein the signal restoration means includes a decision means which performs symbol decision of a symbol included in the information to be communicated corresponding to a positional relationship between a position on the constellation of an electric signal converted by the conversion means and a decision level set on the constellation, and wherein the decision level is a straight line which has rotated $+\pi/4$ from I axis on the constellation, or a straight line which has rotated $+3\pi/4$ from the I axis.

(Supplementary Note 7)

The optical communication system according to supplementary note 6, wherein the decision means provides a change in the decision level of $\pi/2$ whenever symbol decision is performed.

(Supplementary Note 8)

The optical communication system according to any one of supplementary notes 1 to 7, wherein the optical phase modulation means is an optical phase modulator, and wherein the optical phase modulator comprising:

a substrate which is made of any of a nonlinear crystal including $LiTaO_3$, $LiNbO_3$, $Ba_2NaNbO_{15}$, or a semiconductor made of simple substance or combination of two or more of Si, Ge, Ga, As, In, P, N, Al, or polyimide system resin, polyamide system resin, polyether-base resin;

an optical waveguide which is formed on a surface of the substrate by thermal diffusion process or ion implantation technique; and electrode pairs which are made from single or two or more kinds of chemical elements.

(Supplementary Note 9)

An optical communication method which communicates using polarization multiplexed optical signals comprising:

an optical phase modulation step for modulating phases of a plurality of optical signals employing BPSK modulation method which include information to be communicated, and thereby generating a plurality of optical signals to become pseudo QPSK modulation method, and a signal restoration step for performing polarization demultiplexing of a plurality of polarization multiplexed optical signals from a plurality of optical signals modulated to the pseudo QPSK modulation method, and thereby restoring the information to be communicated.

(Supplementary Note 10)

An optical communication device of an optical communication system which communicates using polarization multiplexed optical signals, comprising:

an optical phase modulation means which modulates a phase of an optical signal employing BPSK modulation method which includes information to be transmitted, and thereby generates an optical signal to become pseudo QPSK modulation method, and wherein the optical signal to become the pseudo QPSK modulation method is outputted to a polarization synthesizer which performs polarization multiplexing.

(Supplementary Note 11)

A control method of an optical communication device of an optical communication system which communicates using polarization multiplexed optical signals, comprising:

an optical phase modulation step for modulating a phase of an optical signal employing BPSK modulation method which includes information to be transmitted, and thereby generating an optical signal to become pseudo QPSK modulation method.

(Supplementary Note 12)

A control program of an optical communication device of an optical communication system which communicates using polarization multiplexed optical signals, causing a computer to execute the processing of:

an optical phase modulation step for modulating a phase of an optical signal employing BPSK modulation method which includes information to be transmitted, and thereby generating an optical signal to become pseudo QPSK modulation method.

(Supplementary Note 13)

An optical communication device of an optical communication system which communicates using polarization multiplexed optical signals, comprising:

an optical phase modulation means which modulates phases of a plurality of optical signals in which polarized waves separated from polarization multiplexed light by a polarization beam splitter are orthogonal each other, and thereby generates a plurality of optical signals to become pseudo QPSK modulation method, and signal restoration means which performs polarization demultiplexing of a plurality of polarization multiplexed optical signals from a plurality of optical signals modulated to the pseudo QPSK modulation method, and thereby restores information to be communicated.

(Supplementary Note 14)

A control method of an optical communication device of an optical communication system which communicates using polarization multiplexed optical signals, comprising:

an optical phase modulation step for modulating phases of a plurality of optical signals in which polarized waves separated from polarization multiplexed light by a polarization beam splitter are orthogonal each other, and thereby generating a plurality of optical signals to become pseudo QPSK modulation method, and a signal restoration step for performing polarization demultiplexing of a plurality of polarization multiplexed optical signals from a plurality of optical signals modulated to the pseudo QPSK modulation method, and thereby restoring information to be communicated.

(Supplementary Note 15)

A control program of an optical communication device of an optical communication system which communicates using polarization multiplexed optical signals, causing a computer to execute the processing of:

an optical phase modulation step for modulating phases of a plurality of optical signals in which polarized waves separated from polarization multiplexed light by a polarization beam splitter are orthogonal each other, and thereby generating a plurality of optical signals to become pseudo QPSK modulation method, and a signal restoration step for performing polarization demultiplexing of a plurality of polarization multiplexed optical signals from a plurality of optical signals modulated to the pseudo QPSK modulation method, and thereby restoring information to be communicated.

This application is based upon and claims the benefit of priority from Japanese patent application No. 2010-260156, filed on Nov. 22, 2010, the disclosure of which is incorporated herein in its entirety by reference.

The invention claimed is:

1. An optical communication system for communicating by using polarization multiplexed optical signals, comprising:

a BPSK signal light generating source, which generates BPSK signal light employing BPSK modulation system including information to be communicated;

an optical phase modulation means for modulating a phase of the BPSK signal light by a phase deviation quantity of $\pi/2$, and for generating a plurality of optical signals to become signals by pseudo QPSK modulation system; and a signal restoration means for performing polarization demultiplexing of a plurality of polarization multiplexed optical signals from a plurality of optical signals modulated into the pseudo QPSK modulation system, and for restoring the information to be communicated.

2. The optical communication system according to claim 1, further comprising:

a polarization synthesizing means for performing polarization multiplexing of the plurality of optical signals, and for outputting polarization multiplexed light to an optical transmission path; and an optical separating means for separating the polarization multiplexed light input from the optical transmission path into a plurality of optical signals whose polarizations are orthogonal to each other;

wherein the optical phase modulation means performs phase modulation of the plurality of optical signals employing the BPSK modulation system before polarization multiplexing by the polarization synthesizing means into a plurality of optical signals by the pseudo QPSK modulation system; and the signal restoration means performs polarization demultiplexing of polarization multiplexed optical signal from the plurality of optical signals by the pseudo QPSK modulation system separated by the optical separating means, and restores the information to be communicated.

3. The optical communication system according to claim 1, further comprising:

a polarization synthesizing means for performing polarization multiplexing of the plurality of optical signals, and for outputting polarization multiplexed light to an optical transmission path; and an optical separating means for separating the polarization multiplexed light input from the optical transmission path into a plurality of optical signals whose polarizations are orthogonal to each other;

wherein the optical phase modulation means performs phase modulation of the plurality of optical signals separated by the optical separating means into a plurality of optical signals by the pseudo QPSK modulation system; and the signal restoration means performs polarization demultiplexing of the polarization multiplexed optical signals using the plurality of optical signals by the pseudo QPSK modulation system whose phases have been modulated by the optical phase modulation means, and restores the information to be communicated.

4. An optical communication method for communicating by using polarization multiplexed optical signals, comprising:

generating BPSK signal light employing BPSK modulation system including information to be communicated:

modulating a phase of the BPSK signal light by a phase deviation quantity of $\pi/2$, and generating a plurality of optical signals to become signals by pseudo QPSK modulation system; and performing polarization demultiplexing of a plurality of polarization multiplexed optical signals from a plurality of optical signals modulated into the pseudo QPSK modulation system, and for restoring the information to be communicated.

5. The optical communication system according to claim 1, comprising an optical communication device;

wherein the optical communication device comprises an optical phase modulation means for modulating a phase of an optical signal employing BPSK modulation system comprising information to be communicated, and for generating an optical signal to become a signal by pseudo QPSK modulation system;

wherein the optical signal to become a signal by the pseudo QPSK modulation system is output to a polarization synthesizer performing polarization multiplexing.

6. The optical communication system according to claim 1, comprising an optical communication device;

wherein the optical communication device comprises an optical phase modulation means for modulating phases of a plurality of optical signals whose polarizations are orthogonal to each other, separated from polarization multiplexed light by a polarization beam splitter, and for generating a plurality of optical signals by pseudo QPSK modulation system; and a signal restoration means for performing polarization demultiplexing of a plurality of polarization multiplexed optical signals from a plurality of optical signals modulated into the pseudo QPSK modulation system, and for restoring information to be communicated.

7. The optical communication method for communicating by using polarization multiplexed optical signals according to claim 4,
wherein the optical phase modulation step comprises a step for modulating phases of a plurality of optical signals whose polarizations are orthogonal to each other, separated from polarization multiplexed light by a polarization beam splitter.

8. An optical communication system for communicating by using polarization multiplexed optical signals, comprising:
a BPSK signal light generating source, which generates BPSK signal light employing BPSK modulation system including information to be communicated;
an optical phase modulation unit modulating a phase of the BPSK signal light by a phase deviation quantity of $\pi/2$, and for generating a plurality of optical signals to become signals by pseudo QPSK modulation system; and
a signal restoration unit performing polarization demultiplexing of a plurality of polarization multiplexed optical signals from a plurality of optical signals modulated into the pseudo QPSK modulation system, and for restoring the information to be communicated.

9. The optical communication system according to claim 8, further comprising:
a polarization synthesizer performing polarization multiplexing of the plurality of optical signals, and for outputting polarization multiplexed light to an optical transmission path; and
a polarization beam splitter separating the polarization multiplexed light input from the optical transmission path into a plurality of optical signals whose polarizations are orthogonal to each other;
wherein the optical phase modulation unit performs phase modulation of the plurality of optical signals employing the BPSK modulation system before polarization multiplexing by the polarization synthesizer into a plurality of optical signals by the pseudo QPSK modulation system; and
the signal restoration unit performs polarization demultiplexing of polarization multiplexed optical signal from the plurality of optical signals by the pseudo QPSK modulation system separated by the polarization beam splitter, and restores the information to be communicated.

10. The optical communication system according to claim 8, further comprising:
a polarization synthesizer performing polarization multiplexing of the plurality of optical signals, and for outputting polarization multiplexed light to an optical transmission path; and
a polarization beam splitter separating the polarization multiplexed light input from the optical transmission path into a plurality of optical signals whose polarizations are orthogonal to each other;
wherein the optical phase modulation unit performs phase modulation of the plurality of optical signals separated by the polarization beam splitter into a plurality of optical signals by the pseudo QPSK modulation system; and
the signal restoration unit performs polarization demultiplexing of the polarization multiplexed optical signals using the plurality of optical signals by the pseudo QPSK modulation system whose phases have been modulated by the optical phase modulation unit, and restores the information to be communicated.

* * * * *